United States Patent
Hiraoka

(10) Patent No.: US 12,175,682 B2
(45) Date of Patent: Dec. 24, 2024

(54) COUNTING METHOD, COUNTING DEVICE, AND RECORDING MEDIUM

(71) Applicant: Panasonic Intellectual Property Management Co., Ltd., Osaka (JP)

(72) Inventor: Rui Hiraoka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 340 days.

(21) Appl. No.: 17/699,384

(22) Filed: Mar. 21, 2022

(65) Prior Publication Data

US 2022/0207753 A1 Jun. 30, 2022

Related U.S. Application Data

(63) Continuation of application No. PCT/JP2020/037039, filed on Sep. 29, 2020.

(30) Foreign Application Priority Data

Oct. 25, 2019 (JP) ................................. 2019-194150
Jul. 31, 2020 (JP) ................................. 2020-130145

(51) Int. Cl.
*G06T 7/246* (2017.01)
*G01N 15/1433* (2024.01)
*G01N 15/14* (2006.01)

(52) U.S. Cl.
CPC ......... *G06T 7/246* (2017.01); *G01N 15/1433* (2024.01); *G01N 2015/1486* (2013.01); *G06T 2207/30242* (2013.01)

(58) Field of Classification Search
CPC .................................................... G06T 7/246
See application file for complete search history.

(56) References Cited

U.S. PATENT DOCUMENTS 8,218,132 B2 7/2012 Yamada et al.
9,892,523 B2 2/2018 Milne et al.
(Continued)

FOREIGN PATENT DOCUMENTS

JP 2004-192020 7/2004
JP 2006-223761 8/2006
(Continued)

OTHER PUBLICATIONS

Extended European Search Report issued Dec. 2, 2022 in European Application No. 20879021.2.
(Continued)

*Primary Examiner* — Oneal R Mistry
(74) *Attorney, Agent, or Firm* — Wenderoth, Lind & Ponack, L.L.P.

(57) ABSTRACT

There is provided a counting method for counting a moving bonded body by exerting an external force in a predetermined direction, on a sample capable of containing the bonded body in which a target substance and a moving substance moving in response to exertion of the external force are bonded, the counting method including: obtaining a captured image of an object in the sample captured in a period from a first time point to a second time point later than the first time point during which the external force is exerted; determining a moving direction of the object from a locus, in the image, formed by the object; and counting the object as the bonded body in a case where a degree of coincidence between the predetermined direction and the moving direction is greater than a first threshold.

14 Claims, 16 Drawing Sheets

(56) References Cited

U.S. PATENT DOCUMENTS

| | | | |
|---|---|---|---|
| 11,523,772 B2 * | 12/2022 | Jones | A61M 31/002 |
| 2009/0238413 A1 | 9/2009 | Ikeda et al. | |
| 2014/0308307 A1 * | 10/2014 | Montelione | A61K 39/145 |
| | | | 530/350 |
| 2016/0320289 A1 | 11/2016 | Tanaka et al. | |
| 2018/0136111 A1 | 5/2018 | Ger et al. | |
| 2019/0154580 A1 | 5/2019 | Yasuura et al. | |
| 2020/0016588 A1 | 1/2020 | Yasuura et al. | |
| 2022/0168735 A1 * | 6/2022 | Ortyn | B01F 29/30 |

FOREIGN PATENT DOCUMENTS

| | | |
|---|---|---|
| JP | 2018-081069 | 5/2018 |
| WO | 2017/187744 | 11/2017 |
| WO | 2018/100779 | 6/2018 |

OTHER PUBLICATIONS

International Search Report of PCT application No. PCT/JP2020/037039 dated Dec. 1, 2020.
Office Action issued May 29, 2024 in European Patent Application No. 20879021.2.

* cited by examiner

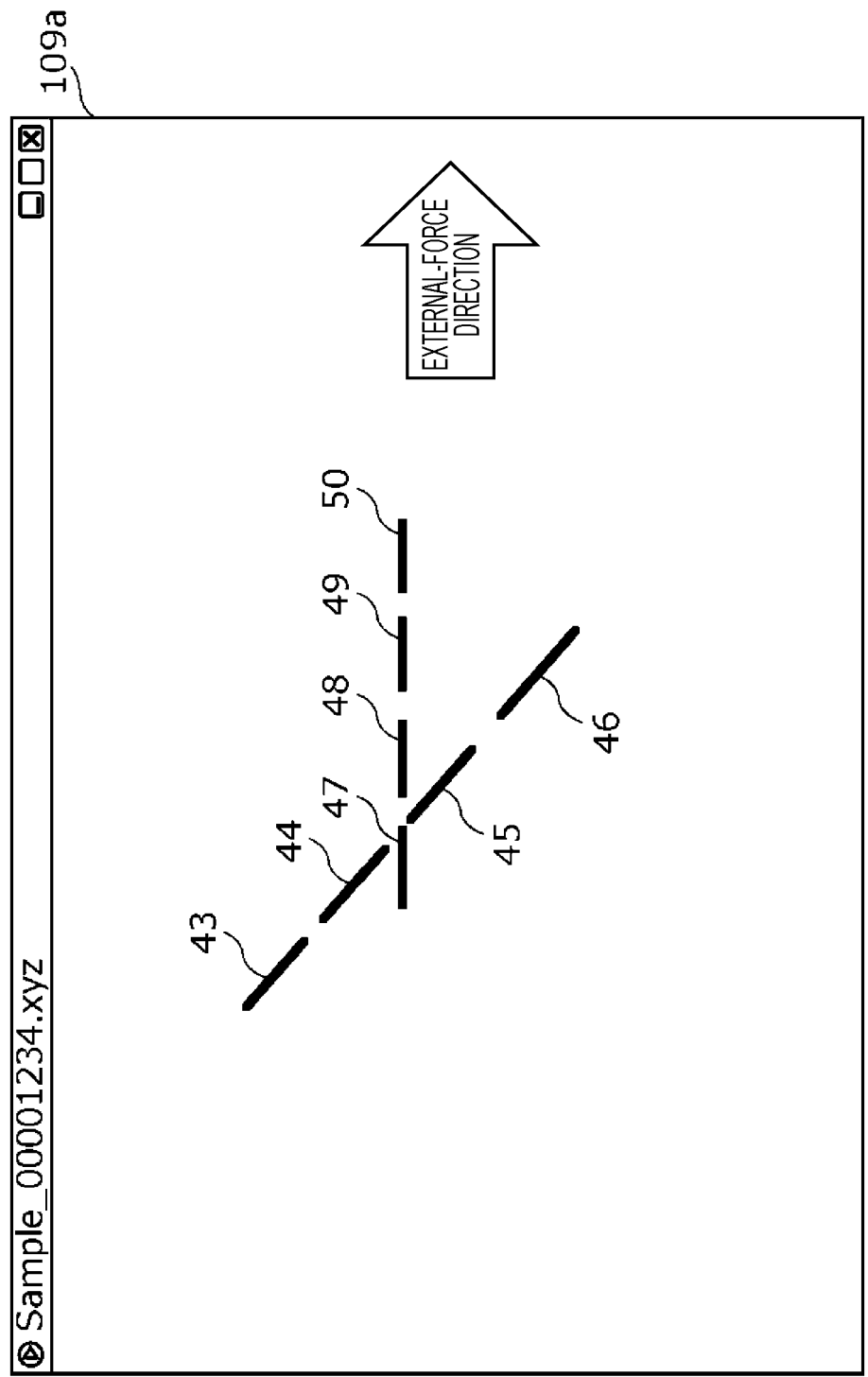

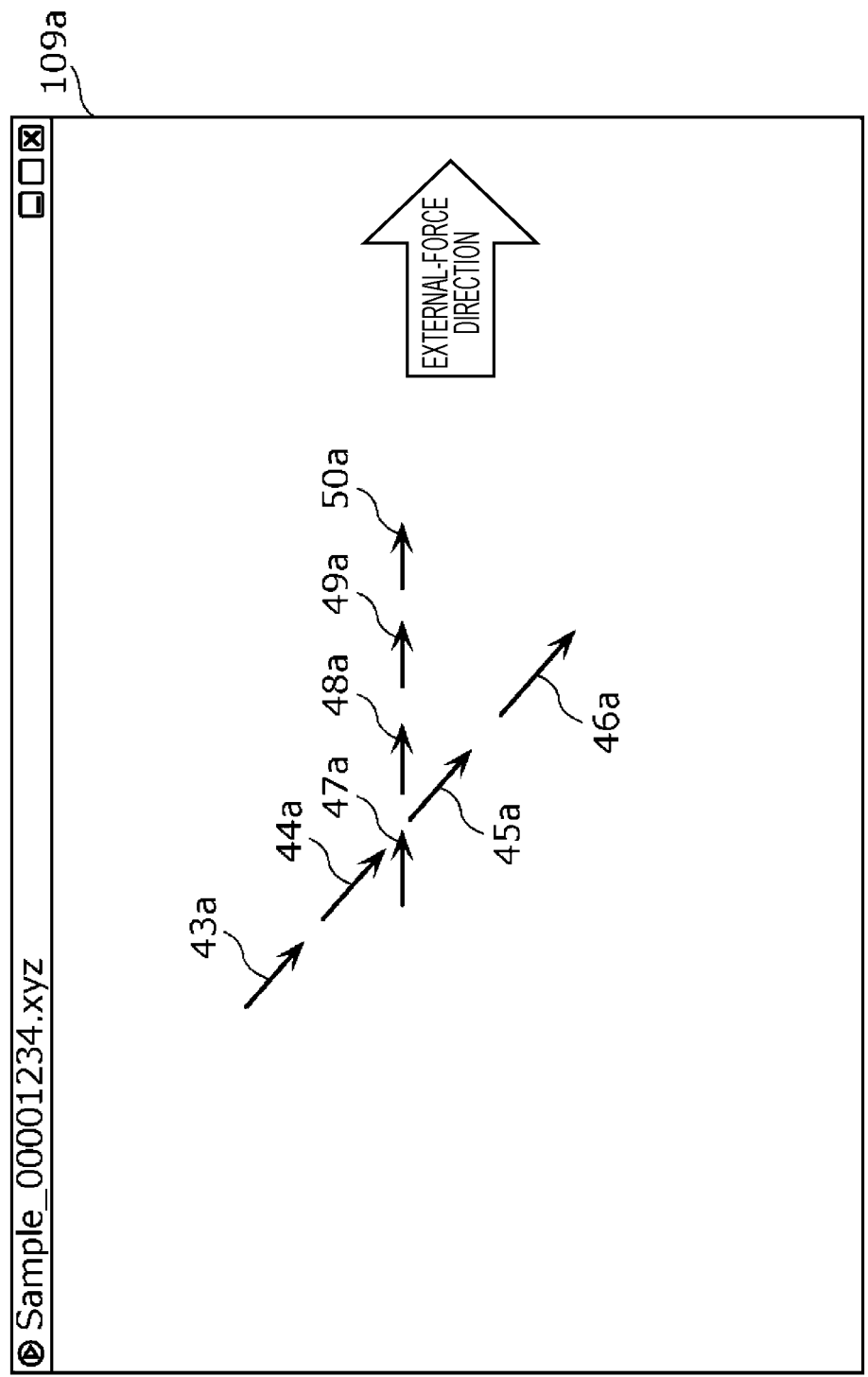

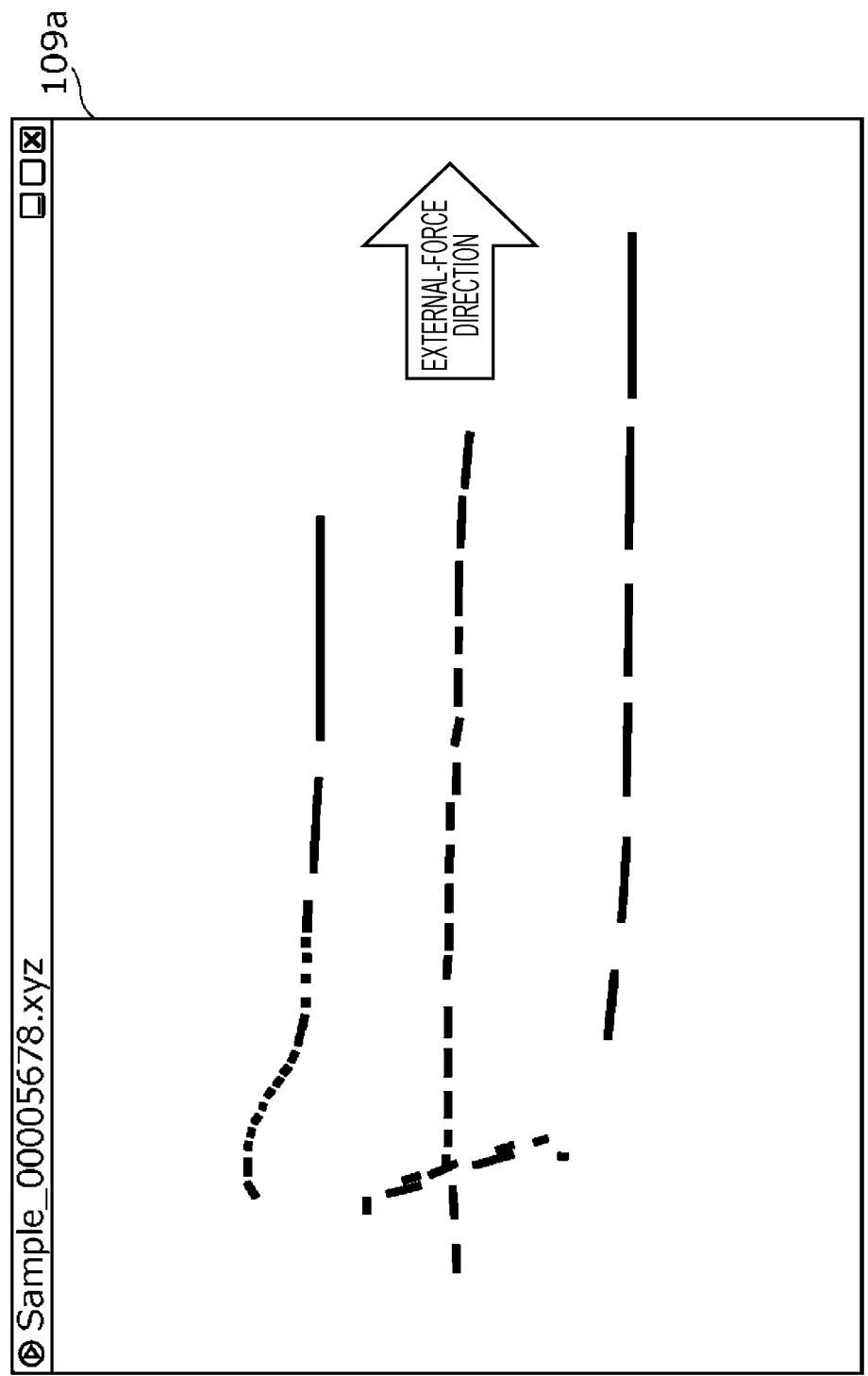

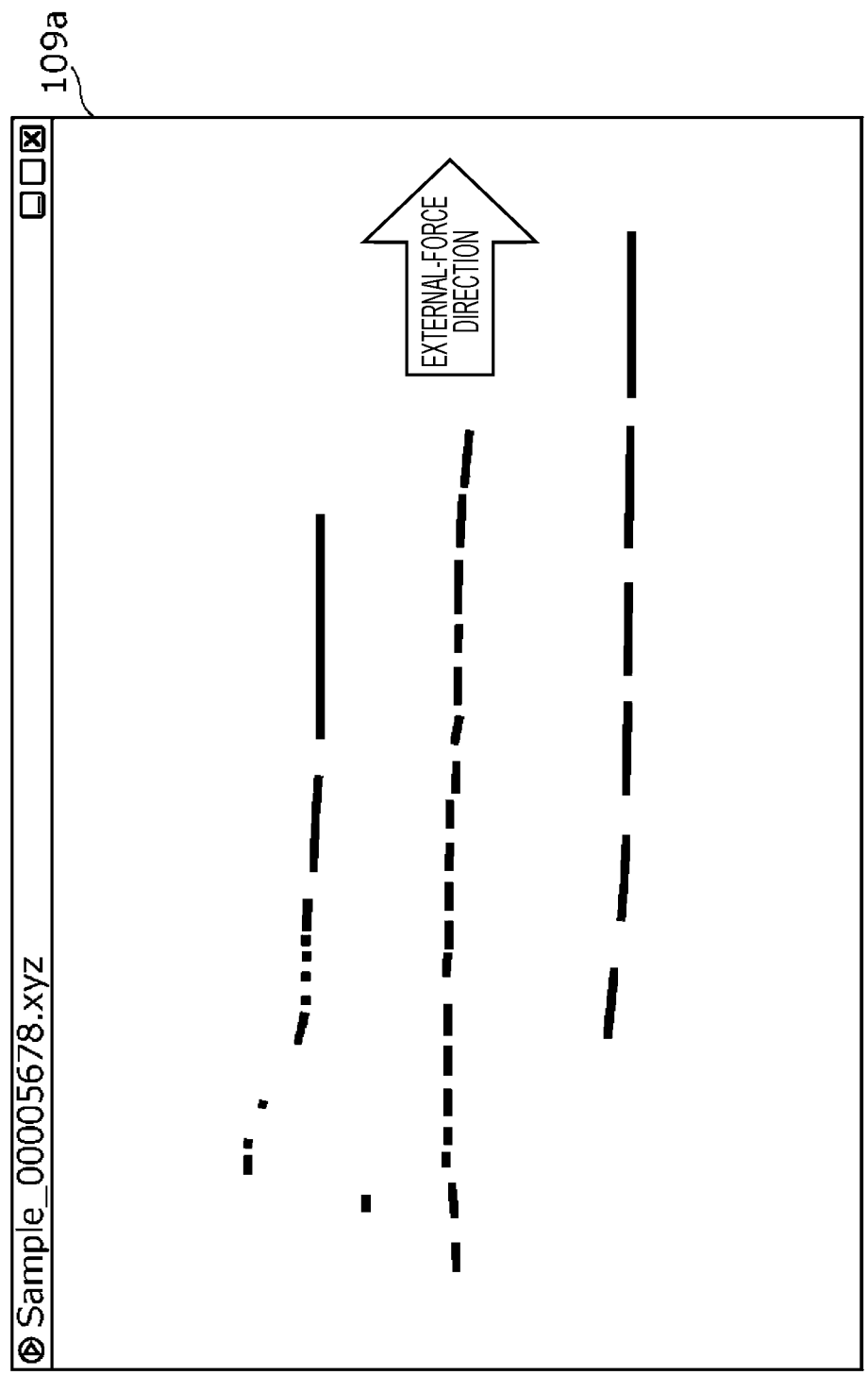

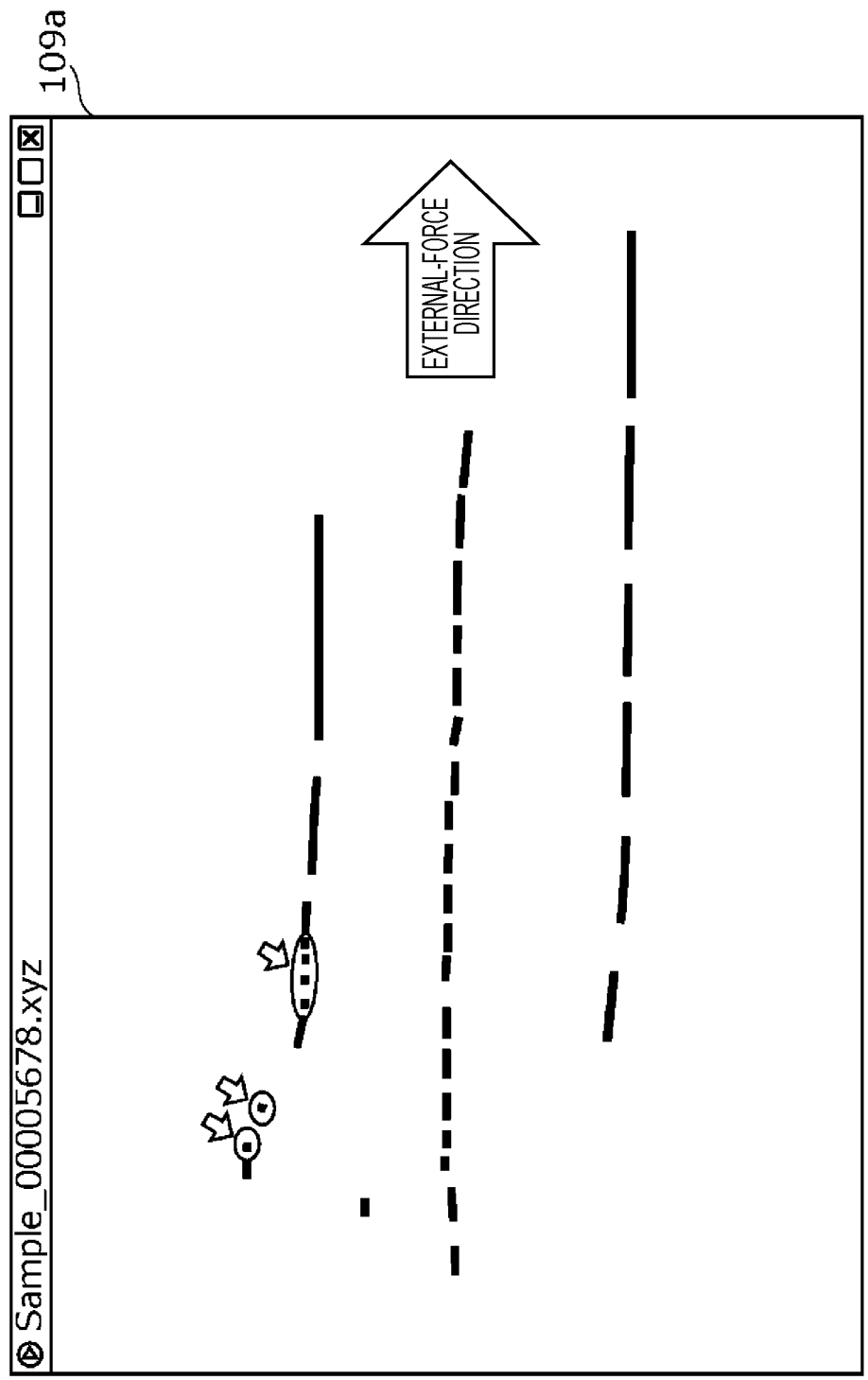

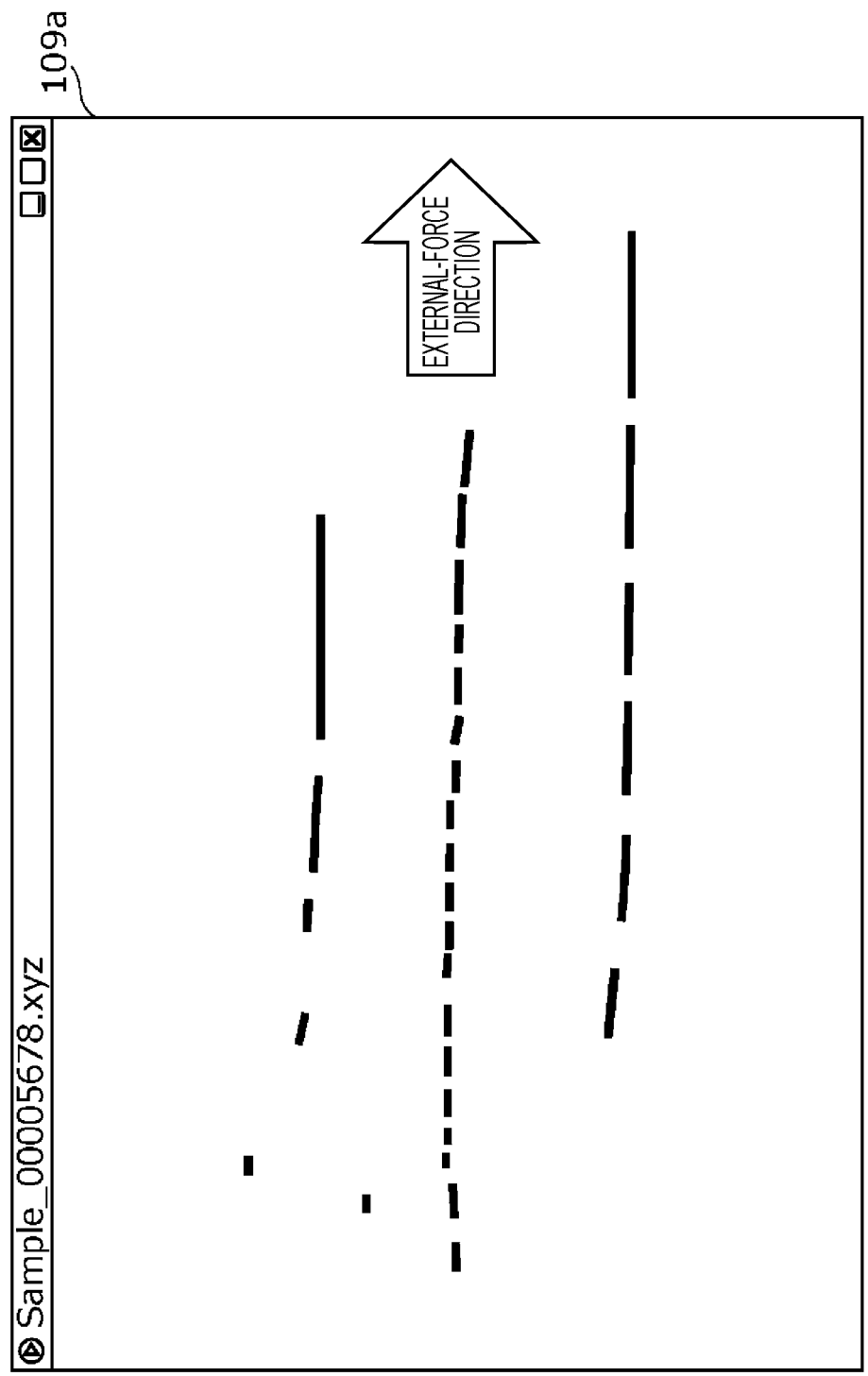

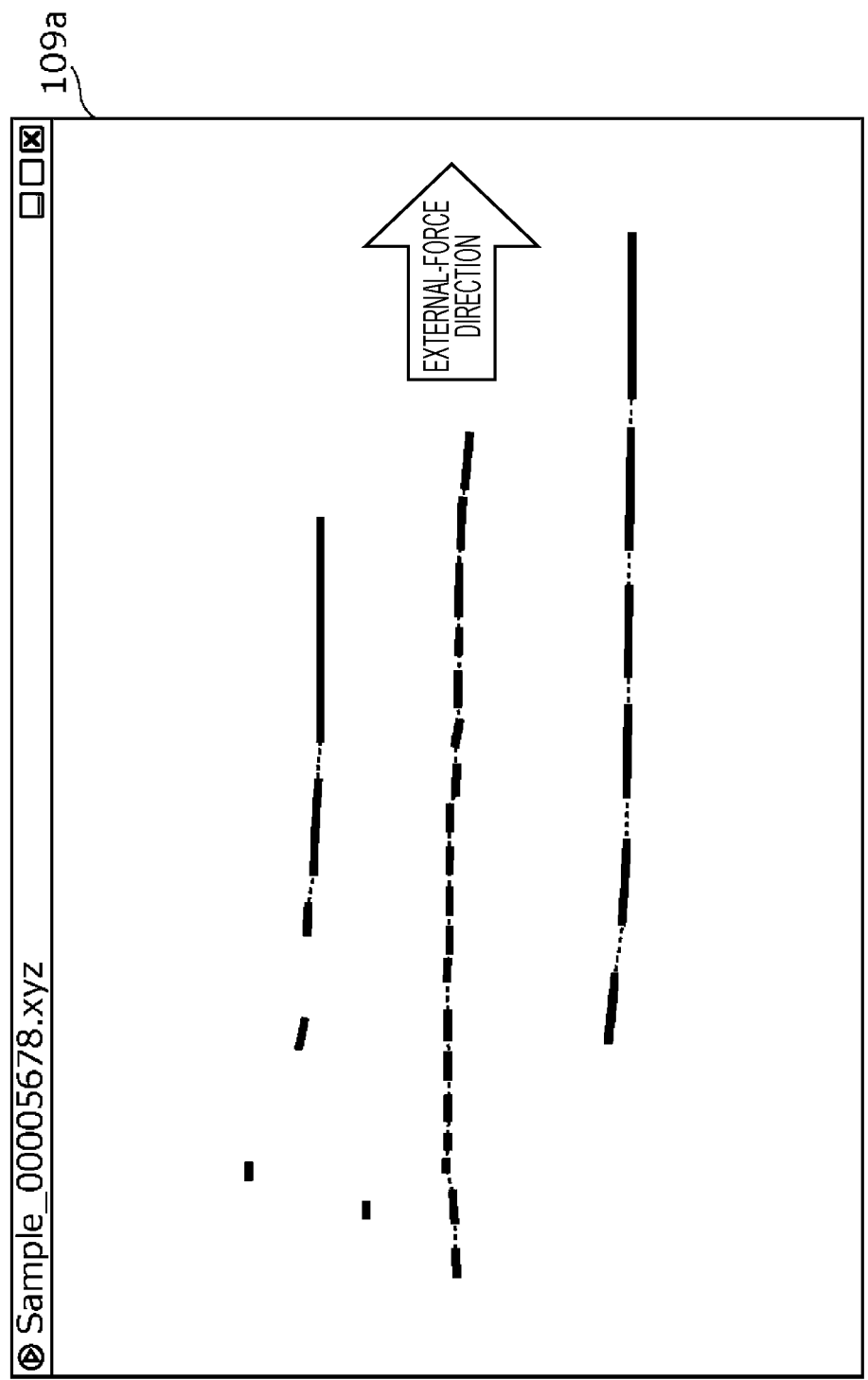

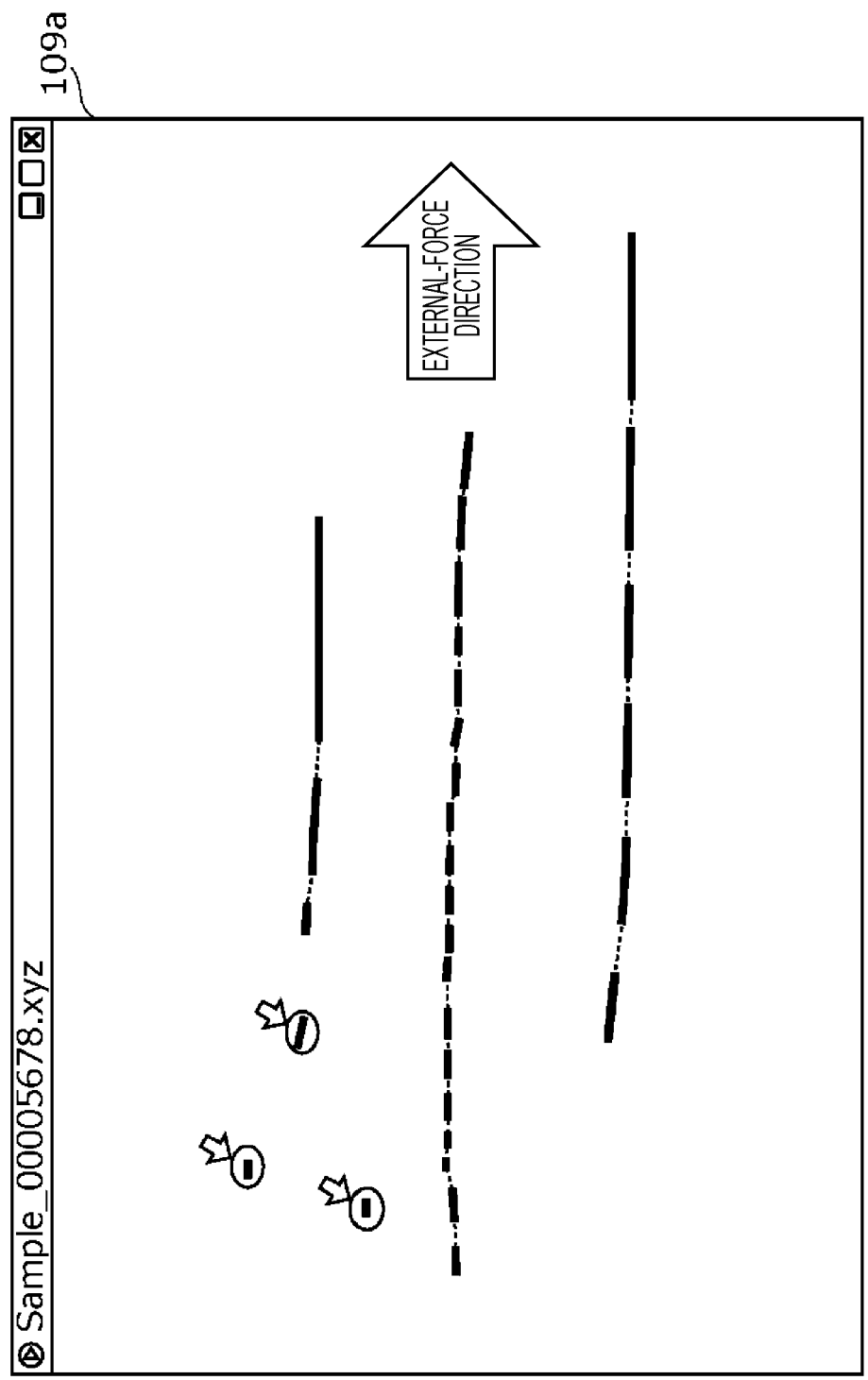

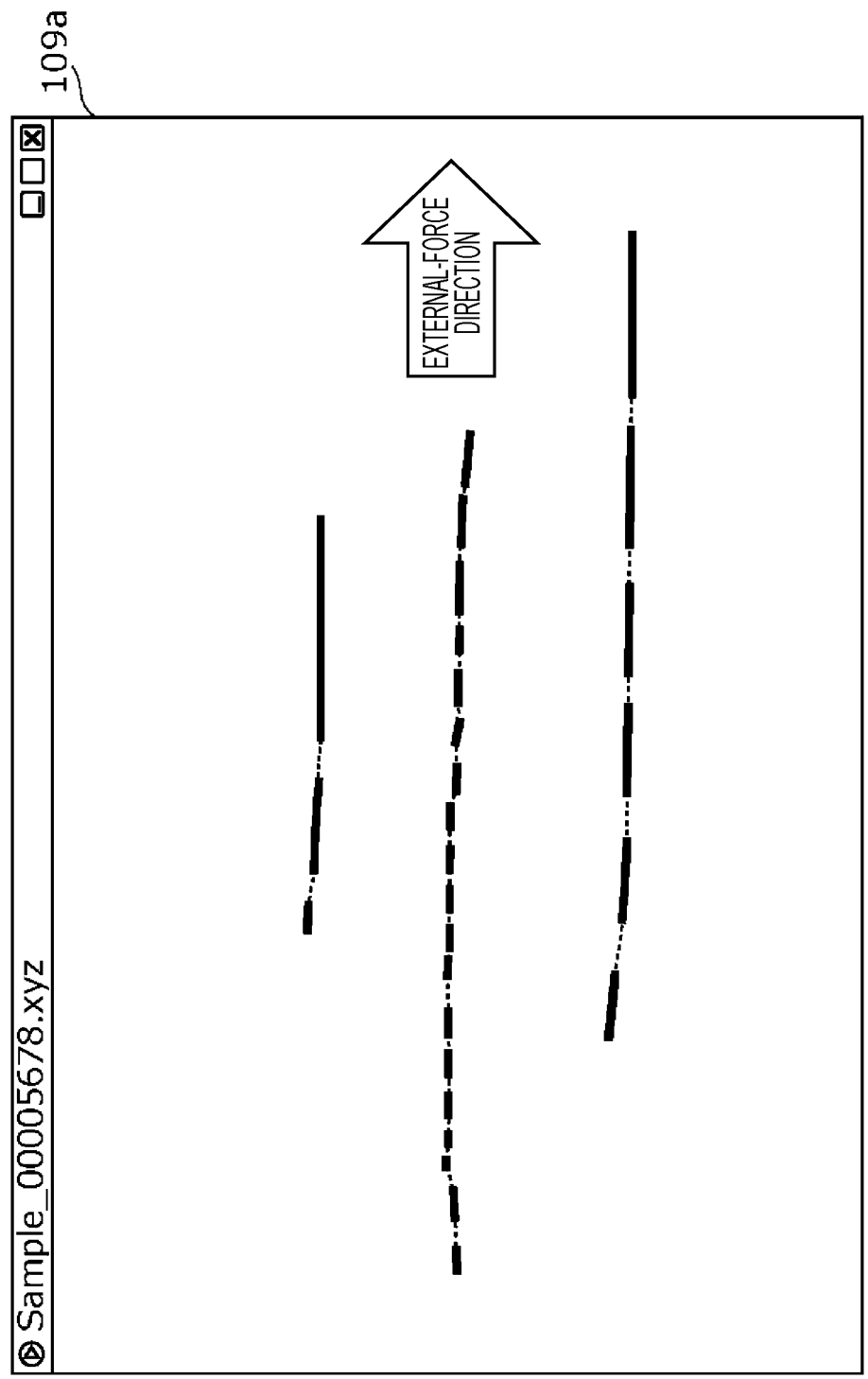

COUNTING METHOD, COUNTING DEVICE, AND RECORDING MEDIUM

BACKGROUND

1. Technical Field

The present disclosure relates to a counting method and a counting device for counting a target substance, such as a virus, and a recoding medium storing a program for causing a computer to perform the counting method.

2. Description of the Related Art

Recently, a method for detecting or quantifying a micro substance present in a solution, specifically, a biological substance such as a virus, has been developed. For example, International Publication No. 2017/187744 discloses an optical detection method in which fluorescence or scattered light from a bonded body that includes a target substance and that is on the surface of a sensing plate is detected as a bright spot in an image by using a nearfield.

SUMMARY

With the method disclosed by International Publication No. 2017/187744, however, it may be difficult to accurately count bonded bodies.

One non-limiting and exemplary embodiment provides a counting method and so on with which bonded bodies can be counted more accurately.

In one general aspect, the techniques disclosed here feature a counting method for counting a moving bonded body by exerting an external force in a predetermined direction, on a sample capable of containing the bonded body in which a target substance and a moving substance moving in response to exertion of the external force are bonded, the counting method including: obtaining a captured image of an object in the sample captured in a period from a first time point to a second time point later than the first time point during which the external force is exerted; determining a moving direction of the object from a locus, in the image, formed by the object; and counting the object as the bonded body in a case where a degree of coincidence between the predetermined direction and the moving direction is greater than a first threshold.

According to the present disclosure, it is possible to count a target substance more accurately.

It should be noted that general or specific aspects may be implemented as a method, a system, an apparatus, an integrated circuit, a computer program, a computer-readable recording medium, or any selective combination thereof. Examples of a computer-readable recording medium include a non-volatile recording medium such as a CD-ROM (compact disc read-only memory).

Additional benefits and advantages of aspects of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a schematic diagram illustrating an image obtained in an embodiment;

FIG. 1B is a schematic diagram illustrating moving directions determined from the obtained image;

FIG. 5A is a first diagram illustrating a procedure for processing an image according to the embodiment;

FIG. 5C is a third diagram illustrating the procedure for processing the image according to the embodiment;

FIG. 5D is a fourth diagram illustrating the procedure for processing the image according to the embodiment;

FIG. 5E is a fifth diagram illustrating the procedure for processing the image according to the embodiment;

FIG. 5F is a sixth diagram illustrating the procedure for processing the image according to the embodiment;

FIG. 5G is a seventh diagram illustrating the procedure for processing the image according to the embodiment;

FIG. 5H is an eighth diagram illustrating the procedure for processing the image according to the embodiment;

DETAILED DESCRIPTIONS

Figure 2A:
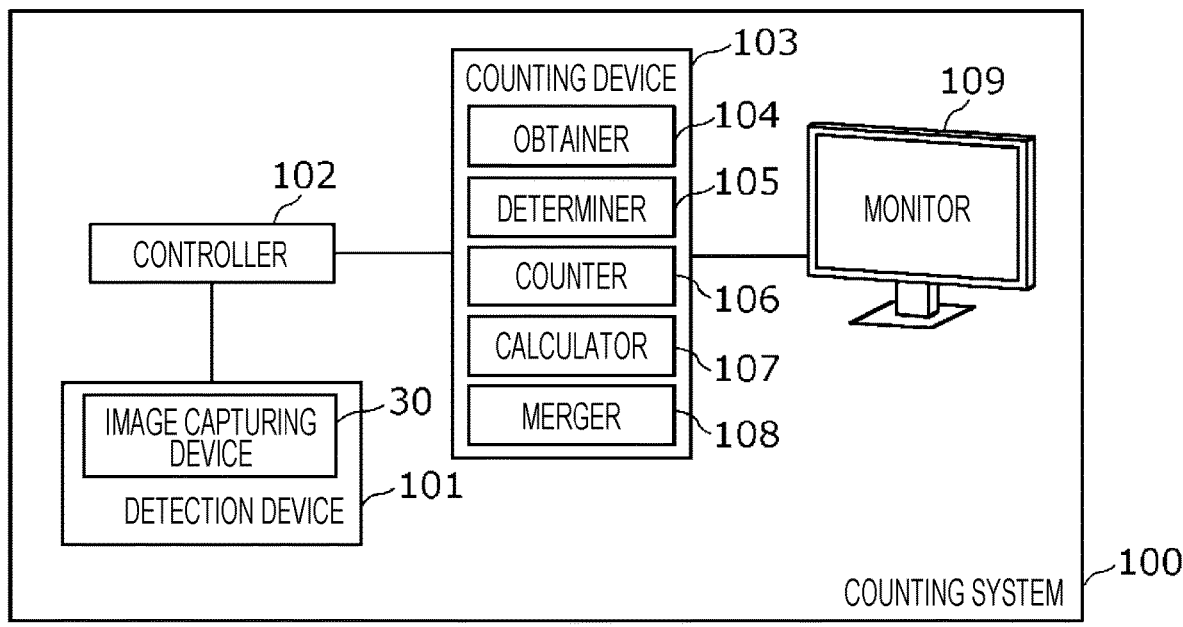
FIG. 2A is a functional block diagram of a counting system according to the embodiment.

Underlying Knowledge Forming Basis of the Present Disclosure

Recently, a method for detecting or quantifying a micro substance present in a solution, specifically, a biological substance such as a virus, has been developed. For example, International Publication No. 2017/187744 discloses an optical detection method in which fluorescence or scattered light from a bonded body that includes a target substance and that is on the surface of a sensing plate is detected as a bright spot in an image by using a nearfield.

In the optical detection method disclosed by International Publication No. 2017/187744, a nearfield is applied to a bonded body that includes a target substance and that is on the surface of a sensing plate to thereby excite a fluorescent substance or a scatterer included in the bonded body, and image capturing by an image capturing device is performed to thereby obtain an image that includes generated fluorescence or scattered light as a bright spot. At this time, when a magnetic substance included in the bonded body is controlled by applying a magnetic field gradient as an external force, the bright spot in the image moves as the bonded body moves. Accordingly, with the optical detection method disclosed by International Publication No. 2017/187744, the moving bright spot among bright spots in the image is regarded as a bright spot resulting from the bonded body that includes the magnetic substance and the fluorescent substance or scatter, and the target substance can be detected.

In optical detection using an image as described above, it becomes common practice to cause a program running on a computer to automatically carry out an image analysis phase. For example, the image obtained with the above-described optical detection method can be regarded as a substantially binarized image including the background and bright spots, and therefore, the bright spots can be easily detected, and a bright spot that moves in response to exertion of an external force needs to be detected. That is, when a composite image is generated by adding up brightness values of frame images obtained at respective time points, a moving bright spot can be detected as a linear locus. When the bright spot that forms such a locus is identified, the target substance can be automatically detected.

Meanwhile, there has been a case where detection of a locus as described above might not be performed accurately. Specifically, in detection of a locus according to the related art, the detection condition is that whether the locus is linear. Therefore, a linear object resulting from other than exertion of an external force has been detected as a locus. Accordingly, a series of non-moving bright spots in a line or a bright spot moving in response to a force caused by, for example, the Brownian movement or convection in a solution sample other than an external force is also detected erroneously.

A sample that is a medium for a detection target has a thickness in a depth direction (also called a depth in a depth direction) when viewed from a detector. Therefore, a bonded body that shakes in the depth direction of the sample appears to be fluorescence or scattered light having a changing intensity when viewed from the detector. In this case, depending on the conditions of image processing, a serial locus may be divided into two or more sections due to interrupted fluorescence or scattered light, which is another issue. A similar issue arises in a case where a bright spot is interrupted in an interval between frame images that form a moving image.

The present disclosure provides a counting method and so on for counting bonded bodies including a target substance to address the above-described issues.

Overview of the Present Disclosure

To address the above-described issues, a counting method according to an aspect of the present disclosure is a counting method for counting a moving bonded body by exerting an external force in a predetermined direction, on a sample capable of containing the bonded body in which a target substance and a moving substance moving in response to exertion of the external force are bonded, the counting method including: obtaining a captured image of an object in the sample captured in a period from a first time point to a second time point later than the first time point during which the external force is exerted; determining a moving direction of the object from a locus, in the image, formed by the object; and counting the object as the bonded body in a case where a degree of coincidence between the predetermined direction and the moving direction is greater than a first threshold.

With the counting method described above, the bonded body that moves in response to exertion of the external force can be distinguished from the others on the basis of the degree of coincidence between the moving direction of the object on the image and the predetermined direction in which the external force is exerted. Specifically, in a case where the calculated degree of coincidence is greater than the first threshold and it is determined that the moving direction and the predetermined direction coincide with each other, it can be determined that the object on the image moves in the direction in which the external force is exerted. Therefore, it is determined that the object is the bonded body that moves in response to exertion of the external force. On the other hand, in a case where the calculated degree of coincidence is less than or equal to the first threshold and it is determined that the moving direction and the predetermined direction do not coincide with each other, it can be determined that the object on the image moves in a direction different from the direction in which the external force is exerted. Therefore, it is determined that the object is, for example, a foreign object that moves regardless of exertion of the external force. Accordingly, bonded bodies can be counted more accurately by performing direction-based determination using the moving direction and the predetermined direction in which the external force is exerted than in a case where determination as to whether the object is the bonded body is performed on the basis of whether the object moves or not.

Further, for example, in the determining, the moving direction of the object is determined on the basis of an eigenvector of a first principal component based on a principal component analysis of pixels that correspond to the locus in the image.

Accordingly, the moving direction can be determined from the locus formed by the object on the basis of the principal component analysis. With the principal component analysis, a lot of information is obtained in addition to the determined moving direction, and the information can be used in determination as to whether the locus results from the bonded body, together with the determined moving direction. Therefore, bonded bodies can be counted more accurately.

Further, for example, the counting method further includes calculating a moving distance of the object during the period from the first time point to the second time point. In the counting, a moving speed of the object counted as the bonded body is output by using the calculated moving distance and a length of the period from the first time point to the second time point.

Accordingly, determination as to whether the locus results from the bonded body can be performed by taking into consideration the moving speed of the object in addition to the determined moving direction. Therefore, bonded bodies can be counted more accurately.

Further, for example, in the calculating, the moving distance is calculated on the basis of an eigenvalue of a first principal component based on a principal component analysis of pixels that correspond to the locus in the image.

Accordingly, the moving distance can be calculated from the locus formed by the object on the basis of the principal component analysis. With the principal component analysis, a lot of information is obtained in addition to the calculated moving distance, and the information can be used in determination as to whether the locus results from the bonded body, together with the calculated moving distance. Therefore, bonded bodies can be counted more accurately.

Further, for example, in the counting, the object is counted as the bonded body in a case where the degree of coincidence is greater than the first threshold and the calculated moving distance is greater than a second threshold.

Accordingly, the determined moving direction and the calculated moving distance can be used in determination as to whether the locus results from the bonded body. Therefore, bonded bodies can be counted more accurately.

Further, for example, the counting method further includes concatenating, among loci in the obtained image, two loci formed by the same object so as to form one locus.

Accordingly, loci broken as a result of image processing can be concatenated, and a locus obtained by concatenation can be used in determination as to whether the locus results from the bonded body. Therefore, bonded bodies can be counted more accurately than in a case of using the broken loci as is.

Further, for example, in the concatenating, among the loci in the obtained image, for a combination of a one locus and another locus for which a degree of similarity between a moving direction corresponding to the one locus and a moving direction corresponding to the other locus is greater than a third threshold and for which a distance between a front end of the one locus in the moving direction corresponding to the one locus and a rear end of the other locus in the moving direction corresponding to the other locus is within a fourth threshold, the front end of the one locus and the rear end of the other locus are connected to each other to form one locus extending from a rear end of the one locus to a front end of the other locus.

Accordingly, loci broken as a result of image processing can be concatenated on the basis of the moving directions and the distance between the loci, and a locus obtained by concatenation can be used in determination as to whether the locus results from the bonded body. Therefore, bonded bodies can be counted more accurately than in a case of using the broken loci as is.

Further, for example, the image is a composite image obtained by adding up brightness values of frame images successively captured in the period from the first time point to the second time point.

Accordingly, the composite image obtained by adding up the successively captured frame images can be used in determination as to whether the locus results from the bonded body. Therefore, the number of images to be processed can be significantly reduced compared with a case of using, for example, a moving image including frame images as is, and a processing capacity required for the counting process can be reduced.

Further, for example, the moving substance is a dielectric and moves in response to a dielectrophoresis force when an external field is applied as the external force.

Accordingly, the dielectric can be used to determine whether the locus of movement, on the obtained image, in response to the dielectrophoresis force results from the bonded body. Therefore, bonded bodies can be counted more accurately.

Further, for example, the moving substance is a magnetic substance and moves in response to a magnetic force when a magnetic field gradient is applied as the external force.

Accordingly, the magnetic substance can be used to determine whether the locus of movement, on the obtained image, in response to the magnetic force results from the bonded body. Therefore, bonded bodies can be counted more accurately.

Further, for example, the target substance is a substance that forms a virus, and the moving substance is bonded to the substance with a bond therebetween, the bond being immobilized on a surface of the moving substance and specifically binding to the sub stance.

Accordingly, the bonded body in which the substance that forms a virus and that is the target substance and the moving substance are bonded together with the bond therebetween can be counted more accurately.

A recording medium according to an aspect of the present disclosure stores a program for causing a computer to perform a counting method for counting a moving bonded body by exerting an external force in a predetermined direction, on a sample capable of containing the bonded body in which a target substance and a moving substance moving in response to exertion of the external force are bonded, the recording medium being a nonvolatile computer-readable recording medium, the counting method including: obtaining a captured image of an object in the sample captured in a period from a first time point to a second time point later than the first time point during which the external force is exerted; determining a moving direction of the object from a locus, in the image, formed by the object; and counting the object as the bonded body in a case where a degree of coincidence between the predetermined direction and the moving direction is greater than a first threshold.

With the recording medium described above, the bonded body that moves in response to exertion of the external force can be distinguished from the others on the basis of the degree of coincidence between the moving direction of the object on the image and the predetermined direction in which the external force is exerted. Specifically, in a case where the calculated degree of coincidence is greater than the first threshold and it is determined that the moving direction and the predetermined direction coincide with each other, it can be determined that the object on the image moves in the direction in which the external force is exerted. Therefore, it is determined that the object is the bonded body that moves in response to exertion of the external force. On the other hand, in a case where the calculated degree of coincidence is less than or equal to the first threshold and it is determined that the moving direction and the predetermined direction do not coincide with each other, it can be determined that the object on the image moves in a direction different from the direction in which the external force is exerted. Therefore, it is determined that the object is, for example, a foreign object that moves regardless of exertion of the external force. Accordingly, bonded bodies can be counted more accurately by performing direction-based determination using the moving direction and the predetermined direction in which the external force is exerted than in a case where determination as to whether the object is the bonded body is performed on the basis of whether the object moves or not.

Hereinafter, embodiments will be specifically described with reference to the drawings.

Note that any of the embodiments described below is a general or specific example. Numerical values, forms, materials, constituent elements, the arrangements and connections of constituent elements, steps, the order of steps, and so on described in the following embodiments are illustrative and are not intended to limit the scope of the claims. Further, each diagram is not necessarily a precise diagram. In the diagrams, configurations that are substantially the same are assigned the same reference numerals, and a duplicated description thereof may be omitted or briefly given.

Further, terms, such as parallel and vertical, that describe relationships between elements, terms, such as rectangular and so on, that describe the shapes of elements, and ranges of numerical values do not necessarily have their exact meanings but may include, for example, a substantially equivalent range having, for example, a difference of about several percent.

Further, counting of bonded bodies described below is a concept that includes counting a target substance that is bonded to a moving substance at a predetermined bonding rate, from the counted number of bonded bodies. That is, the counting method according to the present disclosure can be used as a counting method for counting a target substance. Further, counting of bonded bodies according to the present disclosure includes a concept of measuring the number concentration of counted bonded bodies that are present in a solution sample of a predetermined volume as the concentration of the bonded bodies. Further, measuring of the concentration includes a concept of detecting the presence or absence of bonded bodies based on whether the number concentration in the sample having the predetermined volume is zero or not.

EMBODIMENTS

Overview

First, the concept of image processing in the present embodiment will be described with reference to FIG. 1A and FIG. 1B. FIG. 1A is a schematic diagram illustrating an image obtained in the embodiment. FIG. 1B is a schematic diagram illustrating moving directions determined from the obtained image.

FIG. 1A illustrates, for example, a bonded body that includes a target substance and moves in response to exertion of an external force and a foreign object that moves regardless of exertion of an external force. An image obtained in the present embodiment is displayed on a monitor 109 described below in an application window 109a as illustrated in FIG. 1A. The bonded body and the foreign object are objects that appear on a captured image as bright spots, and it is substantially not possible to distinguish the bonded body and the foreign object from each other from the image. The image obtained in the present embodiment is a composite image obtained by adding up the brightness values of frame images successively captured in the period from a first time point to a second time point.

In a case where simply adding up the brightness values of frame images makes it difficult to grasp a bright spot, each of the frame images may be binarized before addition. A bright spot having a brightness greater than or equal to a predetermined threshold may be extracted and the brightness value of the extracted bright spot may be added. The description in the present disclosure is effective also for a long-exposure image obtained by continuous exposure over the period from the first time point to the second time point.

The brightness value Ici at a pixel position i in a composite image Ic is expressed as follows.

$$Ici = (I1i + \ldots + Iki + \ldots Ini)/n$$

Here, k and n are natural numbers and 1<k<n holds. Frame images successively captured in the period from the first time t1, which is the first time point, to the n-th time tn, which is the second time point, are denoted by I1, . . . , Ik, . . . , In. I1 is captured at time t1, Ik is captured at time tk, and In is captured at time tn. The brightness value I1i is the brightness value at the pixel position i in the frame image I1, the brightness value Iki is the brightness value at the pixel position i in the frame image Ik, and the brightness value Ini is the brightness value at the pixel position i in the frame image In.

The pixel position i in the frame image I1, the pixel position i in the frame image Ik, and the pixel position i in the frame image In each correspond to the pixel position i in the composite image Ic. In the above description, the brightness value may be the pixel value.

As described above, an interval is present between frame images, and the bonded body and the foreign object appear on the image as bright spots forming broken loci in a period corresponding to the interval. Specifically, the foreign object forms a locus 43 corresponding to movement over a first period, a locus 44 corresponding to a second period, a locus 45 corresponding to a third period, and a locus 46 corresponding to a fourth period. The bonded body forms a locus 47 corresponding to the first period, a locus 48 corresponding to the second period, a locus 49 corresponding to the third period, and a locus 50 corresponding to the fourth period.

As found from FIG. 1A, the image capture conditions are set so as to ensure a sufficient exposure period for each frame image such that the bonded body and the foreign object each form a locus having a predetermined length. For example, for a bonded body and a foreign object that move at a lower moving speed, the image capture conditions are set so as to extend the exposure period for each frame image. On the basis of the directions in which respective loci extend, the moving directions of the respective bright spots can be determined.

In FIG. 1B, the moving directions of the bright spots are depicted by arrows. Specifically, a moving direction 43a determined from the locus 43, a moving direction 44a determined from the locus 44, a moving direction 45a determined from the locus 45, and a moving direction 46a determined from the locus 46 are illustrated. Similarly, a moving direction 47a determined from the locus 47, a moving direction 48a determined from the locus 48, a moving direction 49a determined from the locus 49, and a moving direction 50a determined from the locus 50 are illustrated.

Accordingly, when the loci forming a locus that represents movement of each bright spot are concatenated from the rear end (the start side of the rearmost arrow) to the front end (the end side of the foremost arrow) of the loci, the moving direction of the bright spot when the bright spot is considered to move can be determined. Note that the bright spot of, for example, a foreign object that does not actually move may be considered to move as a result of image processing as described above, and the moving direction is determined as a seeming moving direction.

The direction in which an external force is exerted will be described below. In FIG. 1A and FIG. 1B, an external-force direction is depicted by a hollow arrow that is not present on the actually obtained image. As illustrated, an external force is exerted in a predetermined direction in the present embodiment. The predetermined direction is a direction in which the bonded body is assumed to move in response to exertion of the external force. In the following description, a case where an electric field or a magnetic field is applied as the external force will be described. Note that, for example, a flow field may be applied as the external force. In this case, the predetermined direction can be determined on the basis of a drag force related to the flow field.

In the present embodiment, it is determined whether a bright spot moves in response to the external force on the basis of the degree of coincidence between the predetermined direction in which the external force is exerted and the moving direction of the bright spot determined from the obtained image. The bright spot described above is an object present on the image. In the present embodiment, an example case is described where light is emitted due to a phenomenon in which a substance included in the bonded body emits fluorescence or scattered light. As long as an object that is a counting target is satisfactorily formed so as to be detectable, an image captured by reflection of, for example, natural light may be obtained without using a light emission phenomenon by the object. That is, the present embodiment is applicable to a bonded body in which a target substance that is a detection or counting target and a moving substance that moves in response to exertion of an external force are bonded together.

The target substance is, for example, protein, a lipid, sugar, or a nucleic acid and is a biological substance that produces or forms, for example, a virus, a microorganism, or a bacterium that is a detection or counting target. Although the above-described moving substance will be described below, the target substance and the moving substance as described above are bonded together with a bond therebetween, the bond being, for example, an antibody immobilized on the surface of the moving substance. As the bond, for example, any substance that specifically binds to the target substance, such as biotin that binds to avidin included in the target substance, that is, any substance with which, for example, the target substance is modified, can be used instead of the above-described antibody.

System Configuration

A counting system according to the present embodiment will be described below with reference to FIG. 2A and FIG. 2B. FIG. 2A is a functional block diagram of the counting system according to the embodiment. As illustrated in FIG. 2A, a counting system 100 according to the present embodiment includes a detection device 101, a controller 102, a counting device 103, and the monitor 109. Note that in a case where a counting method is performed in which the counting system 100 serves as a server apparatus that obtains an image as described above from a client apparatus and outputs the result of counting to the client apparatus, the counting system 100 needs to include the counting device 103. That is, the detection device 101, the controller 102, or the monitor 109 need not be included.

Figure 2B:
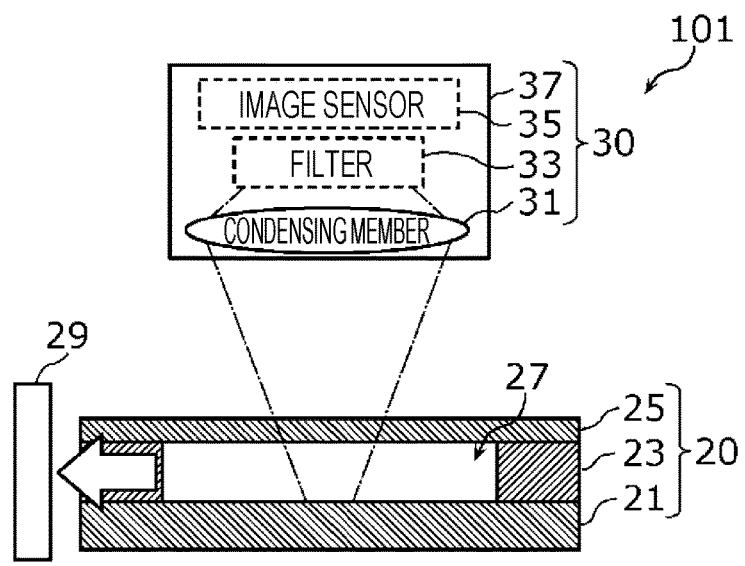
FIG. 2B is a schematic diagram of a detection device according to the embodiment.

FIG. 2B is a schematic diagram of the detection device according to the embodiment. As illustrated in FIG. 2B, the detection device 101 includes a solution holder 20, an external-force applier 29, and an image capturing device 30. In the detection device 101, an image is captured by the image capturing device 30 while an external force is exerted by the external-force applier 29 on a sample stored in a space 27 in the solution holder 20. Each of the constituent elements of the detection device 101 will be described in detail below.

The solution holder 20 includes a sensing plate 21, a solution reservoir 23, and a glass cover 25. The sensing plate 21 is a member having a plate shape and is formed of a hard material, such as resin or glass, having optical transparency. When excitation light from a light source or the like not illustrated is incident on the back surface (the surface on the lower side of the plane of the figure) of the sensing plate 21, a solution in the space 27 near the front surface (the surface on the upper side of the plane of the figure) of the sensing plate 21 is illuminated with the excitation light. In a case where the solution need not be illuminated with the excitation light through the back surface, the sensing plate 21 need not have optical transparency.

The solution reservoir 23 is a member having a sheet shape and stacked on the sensing plate 21 and is formed of, for example, a silicone resin. The solution reservoir 23 has a hollow part formed by making a hole that passes through the sheet from one of the main surfaces to the other main surface. The solution reservoir 23 is stacked on the sensing plate 21 to thereby form a container form surrounded by the front surface of the sensing plate 21 and by the outer periphery of the hollow part (that is, the inner side surface of the solution reservoir 23). In the present embodiment, the hollow part of the solution reservoir 23 has a round shape in plan view of the solution reservoir 23. Therefore, the container form formed of the sensing plate 21 and the solution reservoir 23 has the space 27 having a round columnar form. Note that the shape of the hollow part is not limited to a round shape and may be any shape, such as a polygonal shape.

The glass cover 25 is a member having a plate shape and formed of a hard material, such as resin or glass, and is stacked on the solution reservoir 23. The shape of the glass cover 25 is not limited as long as the glass cover 25 is formed of a translucent material. The glass cover 25 serves as a cover of the space 27 defined by the sensing plate 21 and the solution reservoir 23, and therefore, has a shape and a size with which the hollow part described above can be covered in plan view. Note that the material of the glass cover 25 may be resin or the like instead of glass. The glass cover 25 may have any configuration as long as the glass cover 25 has optical transparency.

Accordingly, the space 27 can be substantially sealed by the sensing plate 21, the solution reservoir 23, and the glass cover 25. As described above, a target sample that is detected or counted by the counting system 100 is stored in the space 27. That is, a bonded body that can be contained in the sample is detected in a state where the solution holder 20 is filled with the sample. The sample is fed into the space 27 with the glass cover 25 open. That is, the glass cover 25 covers an opening through which the space 27 is accessible. The opening is an example of a feed-in part through which the sample that can contain the bonded body is fed. Note that a small hole through which the space 27 communicates with the outside may be provided. In this case, the small hole serves as the feed-in part.

Part of light that travels through the space 27 toward the glass cover 25 is received by the image capturing device 30 that is disposed so as to face the solution holder 20. The image capturing device 30 is a light receiving device in which a condensing member 31 having a condensing capability and an image sensor 35 are housed in a housing 37. The image capturing device 30 may include a filter 33 as necessary that selectively transmits light having a specific wavelength. That is, although the present disclosure can be implemented without the filter 33, an example case where the filter 33 is used to allow light having a specific wavelength to be incident on the image sensor 35 will be described in the present embodiment. The condensing member 31 is, for example, a refractive lens and condenses light received by the image capturing device 30 onto the image sensor 35. The condensing member 31 may be formed of a single lens or formed of lenses.

The filter 33 has optical characteristics so as to, for example, transmit main wavelength components of fluorescence emitted by the bonded body and absorb or reflect the others. Accordingly, fluorescence or scattered light emitted by the bonded body can be detected with high accuracy. The image sensor 35 may be a generally available optical sensor, such as one that includes a photodiode or one that includes a combination of multiplier phototubes. A target for which an image is captured with the image capturing device 30 is a two-dimensional plane along the sensing plate 21, and therefore, a two-dimensional sensor, such as a CCD image sensor or a CMOS image sensor, may be used as the image sensor 35. Accordingly, an image that includes a lot of information can be obtained.

The housing 37 is formed of, for example, metal or resin. The housing 37 has a window on a surface that faces the glass cover 25. Light received through the window is incident on the image sensor 35. In the housing 37, the condensing member 31, the filter 33, and the image sensor 35 are disposed in this order along the optical path of the light received through the above-described window, and a holder (not illustrated) is provided so as to maintain their positional relationship. The above-described window may be formed as the condensing member 31. That is, the condensing member 31 is fitted into an opening formed on the surface of the housing 37 through which light is received to thereby form the above-described window. The housing 37 is formed of a light-shielding material such that external light other than the light incident on the condensing member 31 does not enter the inside of the housing 37.

Figure 3A:
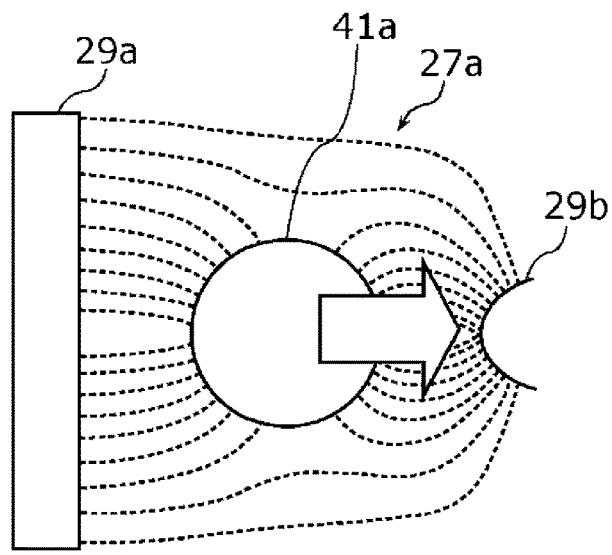
FIG. 3A is a first diagram illustrating a relationship between an external force and a moving substance according to the embodiment.
Figure 3B:
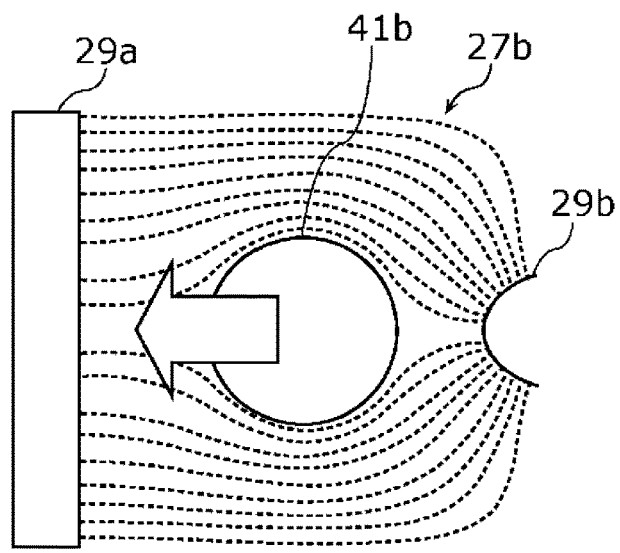
FIG. 3B is a second diagram illustrating a relationship between an external force and a moving substance according to the embodiment.
Figure 3C:
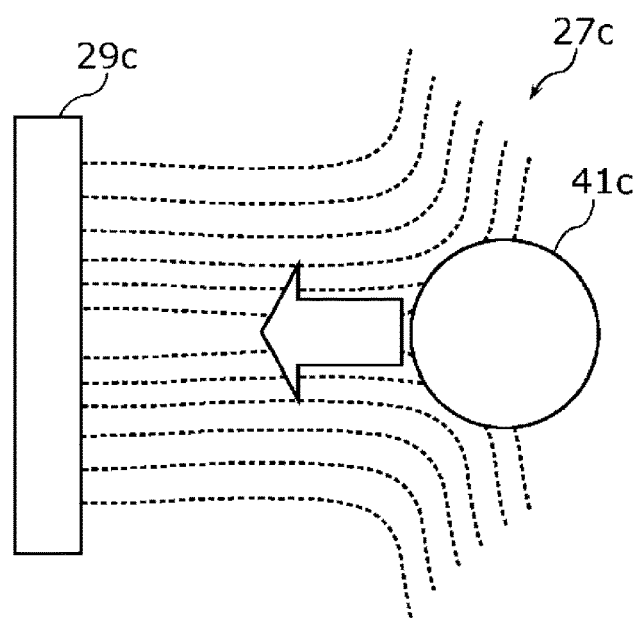
FIG. 3C is a third diagram illustrating a relationship between an external force and a moving substance according to the embodiment.

The external-force applier 29 has different configurations in a case of applying an electric field as an external force and in a case of applying a magnetic field gradient as an external force. These cases will be described with reference to FIG. 3A to FIG. 3C. FIG. 3A is a first diagram illustrating a relationship between an external force and a moving substance according to the embodiment. FIG. 3B is a second diagram illustrating a relationship between an external force and a moving substance according to the embodiment. FIG. 3C is a third diagram illustrating a relationship between an external force and a moving substance according to the embodiment.

In a case where, for example, an electric field is applied as an external force, configurations illustrated in FIG. 3A and FIG. 3B are possible. In FIG. 3A and FIG. 3B, a first electric-field applier 29a and a second electric-field applier 29b, each of which is an example of the external-force applier 29, each apply an electric field to the sample stored in the space 27 to thereby respectively form non-uniform electric fields 27a and 27b. A bonded body 41a includes a dielectric that is a moving substance and moves in accordance with the difference in permittivity between the bonded body 41a and an external solution fraction in the sample and in accordance with the magnitude of the electric field intensity of the electric field 27a and the frequency of an alternating-current power supply used to apply the electric field. A bonded body 41b includes a dielectric that is a moving substance and moves in accordance with the difference in permittivity between the bonded body 41b and the external solution fraction in the sample and in accordance with the magnitude of the electric field intensity of the electric field 27b and the frequency of the alternating-current power supply. The first electric-field applier 29a and the second electric-field applier 29b are electrodes connected to the alternating-current power supply. As the dielectric, for example, polystyrene beads need to be used. The above-described phenomenon is commonly known as dielectrophoresis (DEP).

In dielectrophoresis, in a case where the permittivity of the dielectric is higher than that of the external solution fraction, the dielectric moves through the non-uniform electric field 27a toward a part in which the electric field intensity is high together with the target substance that forms the bonded body 41a, due to dielectrophoresis (positive dielectrophoresis: positive DEP) as illustrated in FIG. 3A. In this case, the predetermined direction is set from a part in which the electric field intensity is low toward the part in which the electric field intensity is high as depicted by the arrow in FIG. 3A. On the other hand, in a case where the permittivity of the external solution fraction is higher than that of the dielectric, the dielectric moves through the non-uniform electric field 27b toward a part in which the electric field intensity is low together with the target substance that forms the bonded body 41b, due to dielectrophoresis (negative dielectrophoresis: negative DEP) as illustrated in FIG. 3B. In this case, the predetermined direction is set from a part in which the electric field intensity is high toward the part in which the electric field intensity is low as depicted by the arrow in FIG. 3B. Accordingly, when the dielectric is used as the moving substance, the bonded body 41a or 41b can be moved in the predetermined direction by using dielectrophoresis.

In a case where, for example, a magnetic field gradient is applied as an external force, a configuration illustrated in FIG. 3C is possible. In FIG. 3C, a magnetic-field applier 29c, which is an example of the external-force applier 29, applies a magnetic field gradient to the sample stored in the space 27 to thereby form a magnetic field gradient 27c. A bonded body 41c includes a magnetic substance that is a moving substance and moves in accordance with the magnetic field gradient 27c. As the magnetic substance, for example, paramagnetic or ferromagnetic metal micro-particles need to be used.

As illustrated in FIG. 3C, the magnetic substance moves through the magnetic field gradient 27c toward the magnetic-field applier 29c together with the target substance that forms the bonded body 41c. Although the magnetic-field applier 29c is, for example, a permanent magnet, such as a neodymium magnet, a ferrite magnet, or an alnico magnet, the magnetic-field applier 29c may be an electromagnet that includes a coil, a core, and a direct-current power supply. In a case where the magnetic field gradient 27c as described above is used, the predetermined direction is set from a part in which the magnetic-field applier 29c is not present toward a part in which the magnetic-field applier 29c is present as depicted by the arrow in FIG. 3C. Accordingly, when the magnetic substance is used as the moving substance, the bonded body 41c can be moved in the predetermined direction.

The detection device 101 exerts in the predetermined direction an external force on the sample stored in the solution holder 20, captures an image of a bonded body that moves in response to the external force, and outputs the image.

Referring back to FIG. 2A, the controller 102 is a control device that generates and transmits to the detection device 101 a control signal to thereby control the detection device 101. The controller 102 also serves as an interface device that transmits an image output from the detection device 101 to the counting device 103 described below. Therefore, an image captured and output by the detection device 101 is received by the counting device 103 via the controller 102.

The counting device 103 is a device that counts bonded bodies moving in response to an external force exerted in the predetermined direction on the sample capable of containing the bonded bodies each including a target substance and a moving substance bonded together, the moving substance moving in response to exertion of the external force. Specifically, the counting device 103 includes an obtainer 104, a determiner 105, a counter 106, a calculator 107, and a merger 108. Each of the constituent elements of the counting device 103 is implemented as a processor, a memory, and a program that is executed by using the processor and the memory. That is, the obtainer 104 is a processing unit for performing an obtaining step, the determiner 105 is a processing unit for performing a determining step, the counter 106 is a processing unit for performing a counting step, the calculator 107 is a processing unit for performing a calculating step, and the merger 108 is a processing unit for performing a merging step.

The monitor 109 is a display device that displays the result of counting of bonded bodies performed by the counting device 103. The monitor 109 displays a display image on, for example, a liquid crystal display panel or an organic EL display panel.

Operations

A counting method implemented by the counting system 100, specifically, operations of the counting device 103, will be described below with reference to the drawings.

Figure 4A:
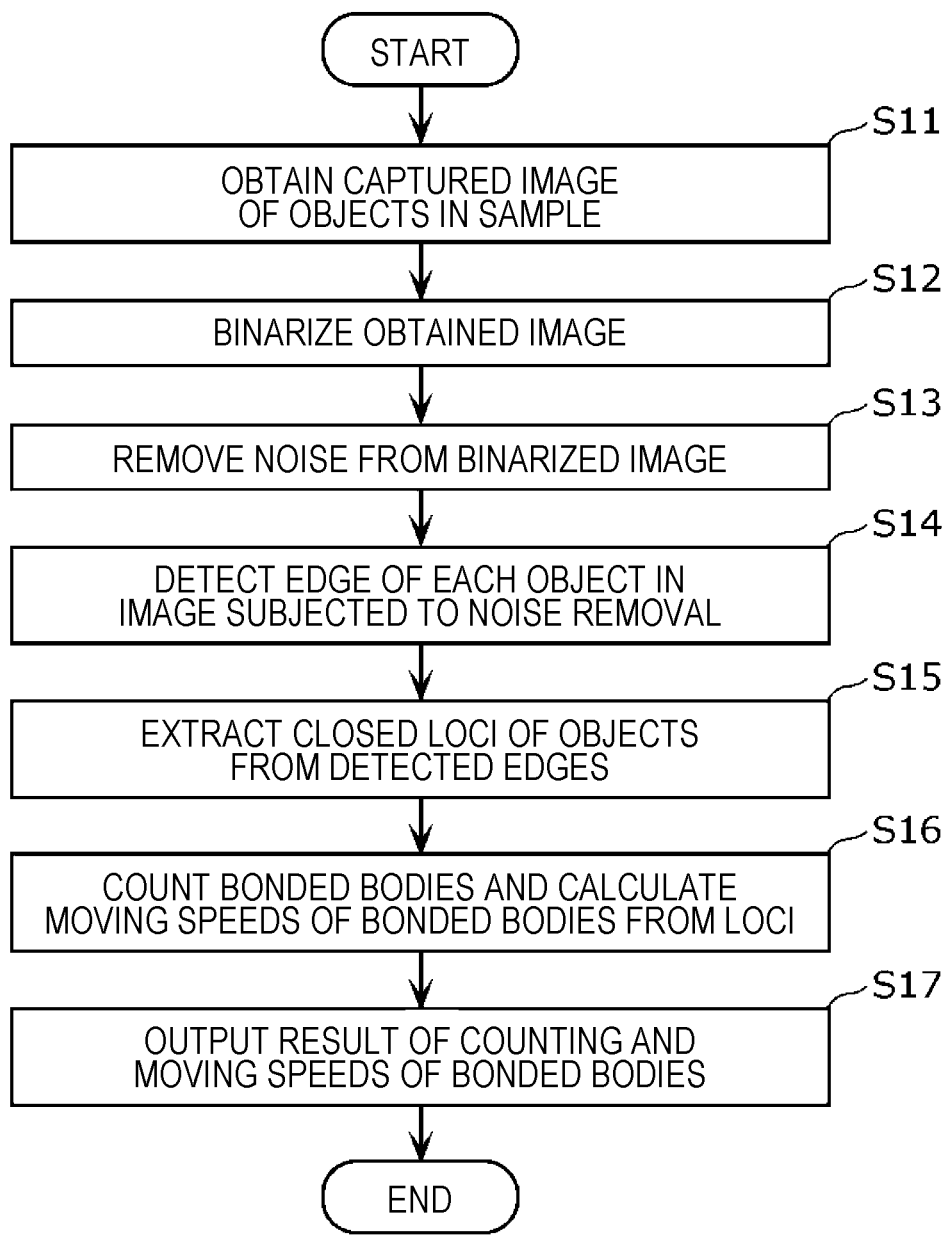
FIG. 4A is a flowchart illustrating a counting method according to the embodiment.

FIG. 4A is a flowchart illustrating the counting method according to the embodiment.

First, in the counting system 100, a captured image of objects in a sample is obtained (obtaining step S11). In the counting system 100, as described above, the detection device 101 operates in accordance with a control signal from the controller 102 to thereby capture an image of the sample, and the captured image is obtained by the obtainer 104 via the controller 102.

The obtained image is binarized in order to distinguish bright spots and the other spots from each other (step S12). Subsequently, the binarized image is subjected to noise removal (step S13). Noise removal is performed by processing the image with a noise removal filter, such as a median filter or a smoothing filter. Movement of bright spots in the captured image subjected to the above-described processing is extracted as loci. Specifically, for the image subjected to noise removal in step S13, edge detection is performed on the basis of a value, among two values, of each brightness value (step S14). For example, a boundary between a high-brightness pixel and a low-brightness pixel is detected as an edge. A part corresponding to a string of boundaries as described above (that is, in a closed state) is extracted as a locus associated with movement of a bright spot (step S15).

Step S12 to step S15 described above are performed by, for example, a pre-processor (not illustrated) included in the counting device 103 as pre-processing steps. Note that the obtainer 104 may obtain the image subjected to the pre-processing steps.

From the loci thus extracted, bonded bodies contained in the sample are counted and the moving speed of each bonded body is calculated (step S16). The counting system 100 outputs the result of counting together with the calculated moving speeds as, for example, a display image to be displayed on the monitor 109 (step S17).

Figure 4B:
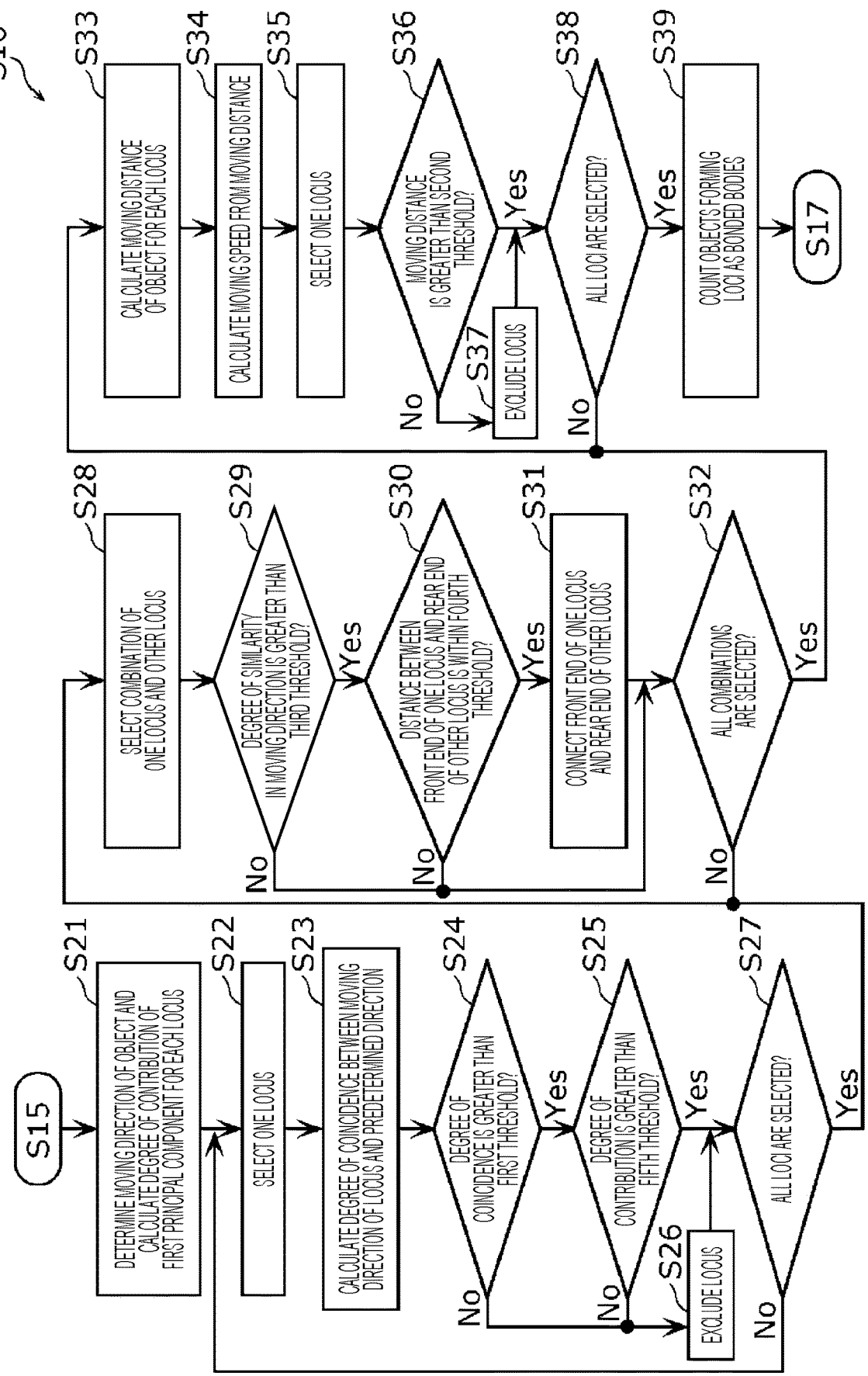
FIG. 4B is a sub-flowchart illustrating the further details of counting of a target substance according to the embodiment.

The further details of step S16 will be described below with reference to FIG. 4B, FIG. 5A to FIG. 5I, and FIGS. 6A and 6B. FIG. 4B is a sub-flowchart illustrating the further details of counting of a target substance according to the embodiment. FIG. 5A to FIG. 5I are diagrams for explaining image processing performed in each processing step.

The counting device 103 obtains an image that is obtained by the obtainer 104 and subjected to the above-described pre-processing steps as illustrated in FIG. 5A. As in FIG. 1A and FIG. 1B, the external-force direction (that is, the predetermined direction) is virtually depicted by a hollow arrow that is not present on the actual image.

In the counting device 103, the principal component analysis is performed for every locus extracted from the image to thereby calculate the first principal component of pixels corresponding the bright spot (illustrated in black in FIG. 5A to FIG. 5I) among two values. The principal component analysis is thus performed for pixels on the image to thereby calculate the eigenvector of the first principal component and the degree of contribution of the first principal component (step S21). The calculated eigenvector indicates a direction in which a set of pixels that forms the locus is distributed to the highest degree and can be regarded as the moving direction of the bright spot. That is, step S21 is the determining step of determining the moving direction of the bright spot.

The counting device 103 selects one locus from among the loci included in the image (step S22). The counting device 103 calculates the degree of coincidence between the moving direction calculated by the principal component analysis performed for the selected locus and the external-force direction (step S23). The degree of coincidence is inferred with reference to a first threshold that is set on the basis of a condition that, for example, the difference in slop on the two-dimensional plane between the external-force direction and the moving direction amounts to what percent of the slope of any of the directions. It is inferred that the degree of coincidence is low in a case where the degree of coincidence is less than or equal to the first threshold and that the degree of coincidence is high in a case where the degree of coincidence is greater than the first threshold. The first threshold may simply be the difference in slope or the difference in angle instead of that defined above.

That is, if the degree of coincidence between the external-force direction and the moving direction is greater than the first threshold, it is determined that the locus for which the moving direction is calculated moves in accordance with the external force. On the other hand, if the degree of coincidence between the external-force direction and the moving direction is less than or equal to the first threshold, it is considered that the locus for which the moving direction is calculated moves in response to a force different from the external force, or does not move but is recognized to move as a result of image processing. Therefore, the degree of coincidence and the first threshold are compared with each other (step S24). If it is determined that the degree of coincidence is less than or equal to the first threshold (No in step S24), the locus is excluded from the counting target (step S26).

Note that the first threshold may be set for a correlation coefficient between pixels corresponding to the bright spot and the external-force direction. For example, when a bright spot for which pixels corresponding to the bright spot have a correlation of more than 80% with the external-force direction (that is the correlation coefficient is greater than 0.8) is left and the other bright spots are excluded, a locus that represents movement in accordance with an external force can be satisfactorily extracted.

Figure 5B:
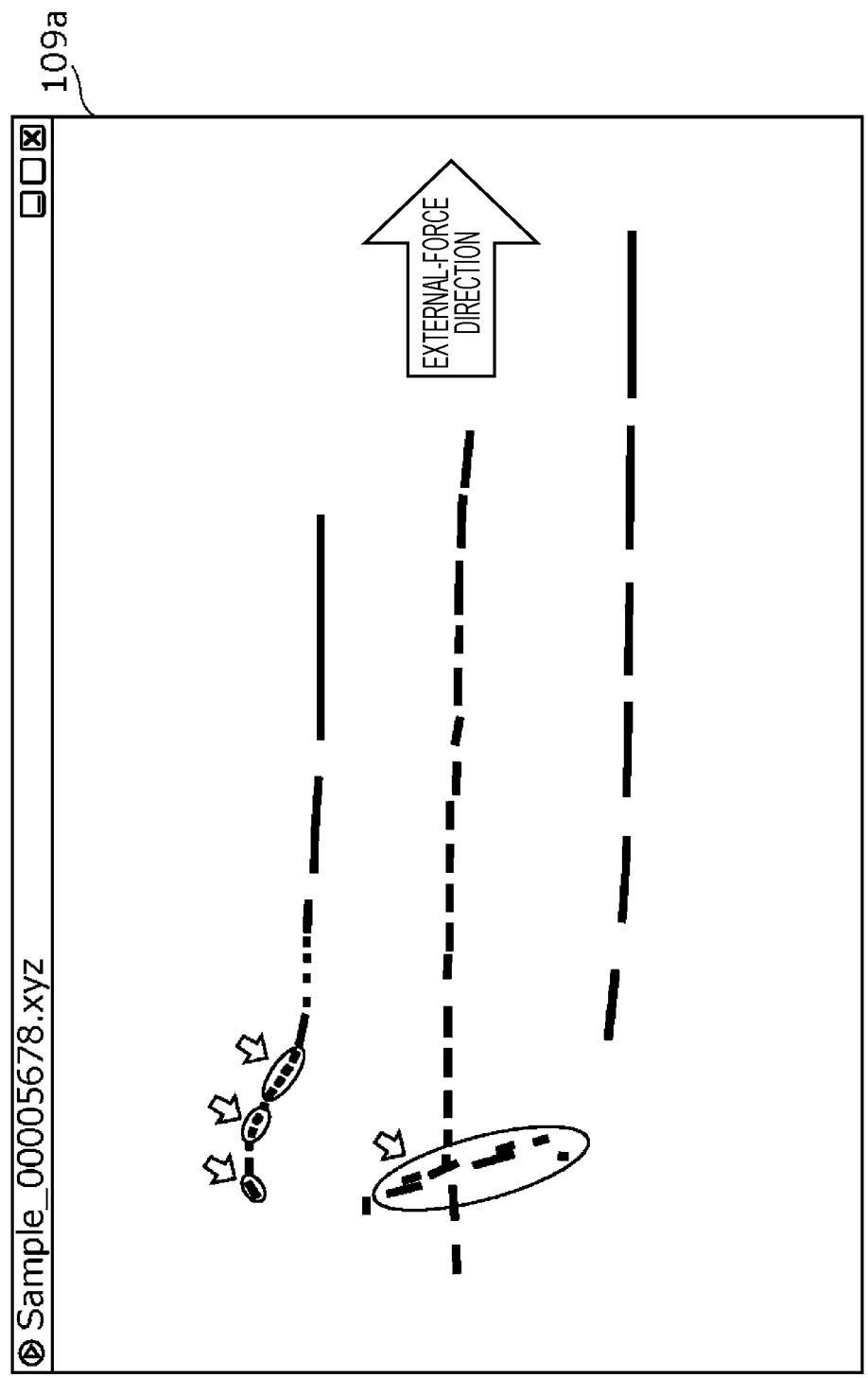
FIG. 5B is a second diagram illustrating the procedure for processing the image according to the embodiment.

FIG. 5B illustrates that the degree of coincidence of each circled locus indicated by an arrow is less than or equal to the first threshold. Therefore, the circled loci are excluded from loci that are used in counting, as illustrated in FIG. 5C.

Figure 6A:
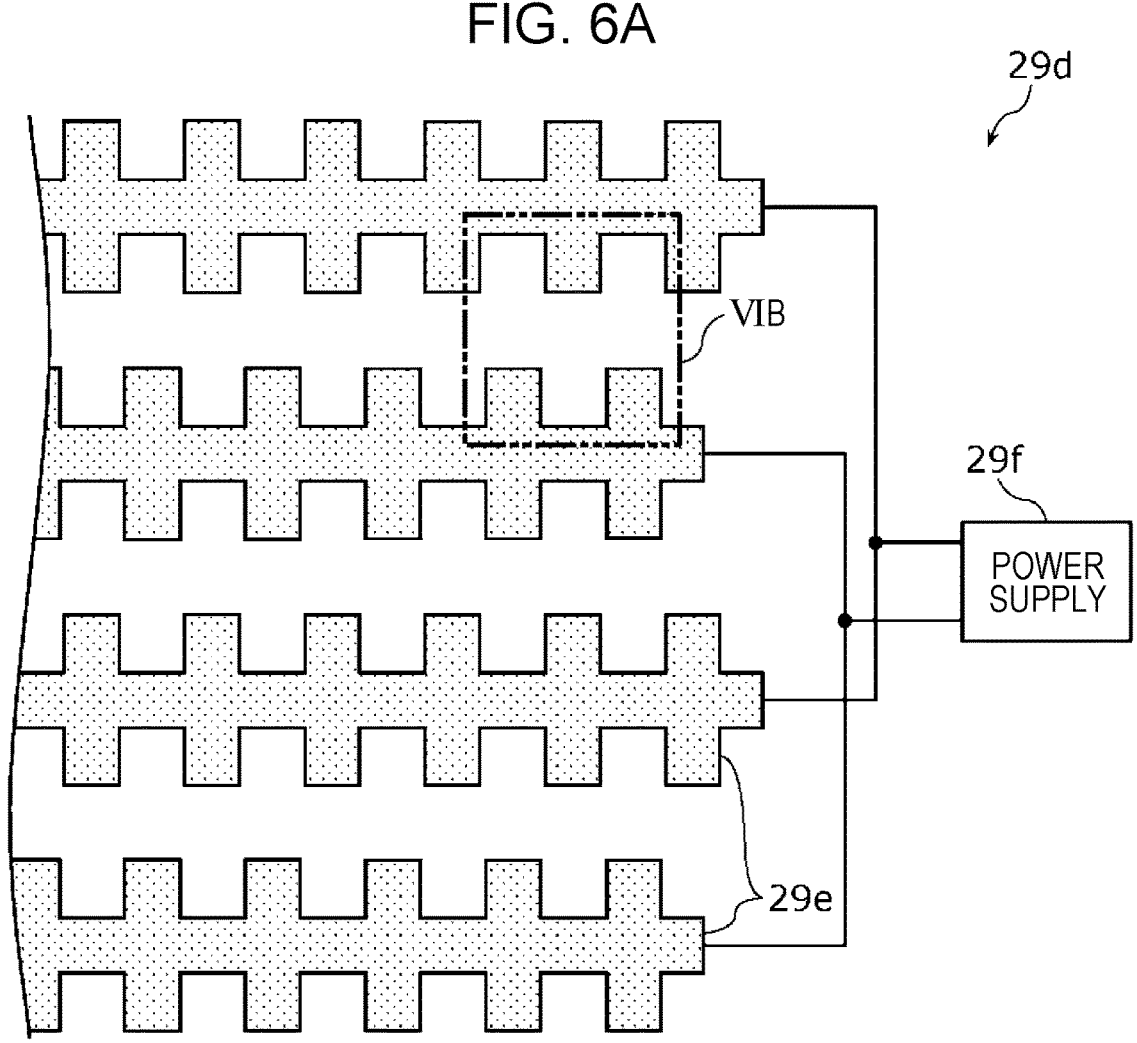
FIGS. 6A and 6B are diagrams illustrating the degree of coincidence in a case of using dielectrophoresis in the embodiment.
Figure 6B:
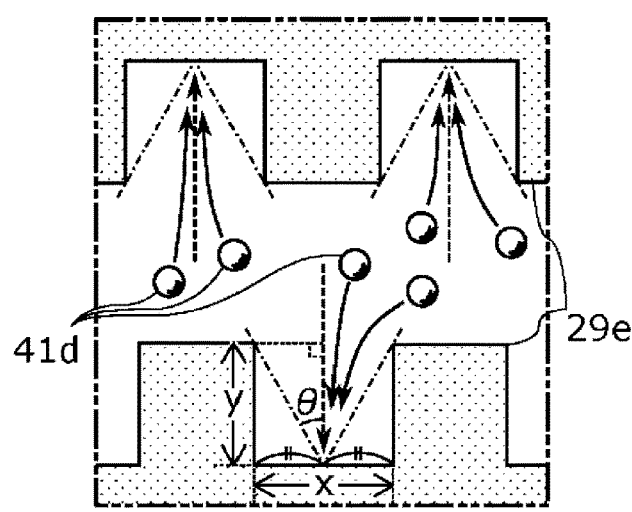

With reference to FIGS. 6A and 6B, a comparison between the degree of coincidence and the first threshold in a case of using dielectrophoresis described with reference to FIG. 3A and FIG. 3B will be described. FIGS. 6A and 6B are diagrams illustrating the degree of coincidence in a case of using dielectrophoresis in the embodiment. FIG. 6A illustrates an electric-field applier 29d for forming an electric field that serves as an external force. FIG. 6B is an enlarged view of the region B outlined by a two-dot chain line in FIG. 6A. FIG. 6B also illustrates dielectrics 41d, not illustrated in FIG. 6A, that correspond to a dielectric moving substance. Although FIGS. 6A and 6B illustrate the actual moving substance (that is, the dielectrics 41*d*) instead of bright spots and the electric-field applier 29*d* for the convenience of illustration, an image that includes a locus of each bright spot corresponding to the moving substance and the background is actually obtained as in the above-described example.

As illustrated in FIG. 6A, the electric-field applier 29*d* includes electrodes 29*e* and a power supply 29*f* that applies an alternating-current voltage to the electrodes 29*e*. The electrodes 29*e* each have a flat plate shape and have a plate surface extending in a direction along the plane of the figure and, for example, are formed on a substrate having a substrate surface extending in the direction along the plane of the figure, so as to be disposed along the substrate surface. When the dielectrics 41*d* are put on the substrate, the dielectrics 41*d* move in accordance with an electric field gradient formed between the electrodes 29*e* on the substrate.

As illustrated in FIG. 6A, each of the electrodes 29*e* is formed in the direction along the plane of the figure in an uneven shape in which indentations and projections are regularly repeated in the right-left direction of the plane of the figure. The electrodes 29*e* adjacent to each other are disposed such that indentations of one of the electrodes 29*e* are shifted relative to indentations of the other and projections of one of the electrodes 29*e* are shifted relative to projections of the other, and therefore, indentations of one of the electrodes 29*e* and projections of the other directly face each other. Accordingly, the distance between the electrodes 29*e* differs depending on the position, and therefore, an electric field gradient is formed between the electrodes 29*e* in response to application of the alternating-current voltage. Specifically, in the configuration of the electric-field applier 29*d* in FIG. 6A, each indentation in each electrode 29*e* is a region having a low electric field intensity and is a region in which the dielectrics 41*d* gather due to negative dielectrophoresis. The electrode 29*e* as described above may be called a castellated electrode.

As illustrated in FIG. 6B, the indentations similarly become regions having a low electric field intensity, and the dielectrics 41*d* put near each indentation gather in the indentation due to the formed electric field gradient. Each of the dielectrics 41*d* moves in accordance with the formed electric field gradient, and therefore, the external-force direction needs to be determined on the basis of the configuration, of the electrodes 29*e*, that is a factor based on which the electric field gradient is determined, a preliminary experiment, an empirical rule, and so on. In the example of the electrodes 29*e* in FIG. 6B, as an average direction toward the inside of each indentation, a linear vector depicted by the dashed arrow extending toward the indentation from a projection facing the indentation is set as the external-force direction.

In the example, determination as to whether each moving direction coincides with the external-force direction is performed on the basis of the angle made by the moving direction and the external-force direction, the angle being set so as to satisfactorily cover the dielectrics 41*d* that enter the indentation. In the example in FIG. 6B, the angle is determined on the basis of the width of each indentation indicated by the symbol x (in other words, the distance between adjacent projections) and the depth of each indentation indicated by the symbol y (in other words, the height of each projection). In FIG. 6B, the angle made by the linear vector that indicates the external-force direction and each of the two dot-dash lines extending into the indentation is employed as the above-described angle. Therefore, a locus that indicates a direction toward the inside of an indentation, as represented by the direction of the linear vector, and that indicates a moving direction within the range between the two dot-dash lines needs to be regarded as the locus of the dielectric 41*d* that is a moving body and to be adopted as the counting target. In other words, a locus that indicates a direction other than the direction toward the inside of an indentation or that indicates a moving direction outside the range between the two dot-dash lines needs to be regarded as a locus of other than a moving body and excluded from the counting target.

The angle made by two straight lines (or vectors in a case of taking into consideration directions) can be expressed as the cosine similarity between the straight lines. Therefore, to determine the coincidence between a moving direction and the external-force direction described above, a threshold (that is, the first threshold) set on the basis of the cosine similarity can be used. Specifically, a moving direction that makes the largest angle with the vector depicted by the dashed arrow within the range in which the moving direction is considered to coincide with the external-force direction is a direction along any one of the two dot-dash lines (hereinafter also called a dot-dash line direction). Each dot-dash line extends so as to correspond to a corresponding indentation having a rectangular shape and is set as the hypotenuse of the right-angled triangle having two sides orthogonal to each other and having a length y and a length x/2. That is, the angle θ made by the dot-dash line direction and the vector depicted by the dashed arrow can be expressed by expression 1 below by using an arccosine function.

$$\theta = \cos^{-1}\frac{y}{\sqrt{y^2 + \frac{x^2}{4}}}$$

That is, as the cosine similarity that is the first threshold, a numerical value determined on the basis of the values of x and y is set as expressed by expression 2 below.

$$\frac{y}{\sqrt{y^2 + \frac{x^2}{4}}}$$

Note that the external-force direction and the first threshold are examples in a case where the electrodes 29*e* having rectangular indentations illustrated in FIGS. 6A and 6B are used and may be set as appropriate in accordance with, for example, the required accuracy of counting in addition to the configuration of the electrodes 29*e*, an experiment, an empirical rule, and so on.

Referring back to FIG. 4B, if it is determined that the degree of coincidence is greater than the first threshold (Yes in step S24), the flow proceeds to step S25. Here, in a case where the degree of contribution of the first principal component is low, it is not inferred that the locus has a sufficient distribution axis. Therefore, in such a case where the degree of contribution of the first principal component is low, the moving direction of the bright spot might not be accurately calculated. That is, the degree of contribution of the first principal component and a fifth threshold are compared with each other (step S25). If it is determined that the degree of contribution of the first principal component is less than or equal to the fifth threshold (No in step S25), there is a possibility that the moving direction is not accurately calculated for the locus, and therefore, the locus is excluded from the counting target (step S26).

FIG. 5D illustrates that for each circled locus indicated by an arrow, the degree of contribution of the first principal component is less than or equal to the fifth threshold. Therefore, the circled loci are excluded from loci used in counting, as illustrated in FIG. 5E.

Referring back to FIG. 4B, if it is determined that the degree of contribution of the first principal component is greater than the fifth threshold (Yes in step S25), it is determined whether all loci are selected and comparisons with the first threshold and with the fifth threshold described above are made (step S27). If there is a locus that is not yet selected (No in step S27), the flow returns to step S22, and a locus is selected. On the other hand, if it is determined that all loci are selected (Yes in step S27), the flow proceeds to step S28.

In the following processes, the counting device 103 performs a merging step of concatenating loci originally forming one locus but broken due to the conditions of image processing and in association with movement of the bonded body in the sample. First, the counting device 103 selects a combination of one locus and another locus from among the loci in the image (step S28). It is determined whether the moving direction of the one locus and that of the other locus in the selected combination are similar to each other (step S29). When bright spots are derived from the same bonded body, it is inferred that the directions in which the respective bright spots move in response to exertion of an external force substantially coincide with each other.

Therefore, if the degree of similarity indicating the degree of similarity between the moving direction of the one locus and that of the other locus is less than or equal to a third threshold (No in step S29), the subsequent step S30 and step S31 are skipped, and the one locus and the other locus are not concatenated. If it is determined that the degree of similarity between the one locus and the other locus is greater than the third threshold (Yes in step S29), determination in step S30 is performed. Specifically, it is determined whether the distance between the front end of the one locus and the rear end of the other locus is within a fourth threshold (in other words, is less than or equal to the fourth threshold) (step S30).

This is a process for preventing bright spots that are distant from each other (in terms of, for example, the euclidean distance) on the image plane and that move in parallel in similar moving directions from being connected to each other. Therefore, if it is determined that the distance is greater than the fourth threshold (No in step S30), step S31 is skipped, and the one locus and the other locus are not concatenated. On the other hand, if it is determined that the distance is within the fourth threshold (Yes in step S30), the front end of the one locus and the rear end of the other locus are connected to each other to form one locus that extends from the rear end of the one locus to the front end of the other locus (step S31).

The counting device 103 determines whether the processes described above are performed for all combinations of two loci (step S32). If there is a combination that is not yet selected (No in step S32), the flow returns to step S28, and a combination is selected. On the other hand, if it is determined that all combinations are selected (Yes in step S32), the flow proceeds to step S33.

In FIG. 5F, for any combination of loci that satisfy the conditions of the third threshold and the fourth threshold, the loci are concatenated as depicted by the dashed lines.

Subsequently, the counting device 103 uses loci for which concatenation is completed and calculates from each of the loci the moving distance of the bright spot (calculating step S33). Specifically, the counting device 103 performs the principal component analysis for each of the loci subjected to the merging step and calculates the eigenvalue of the first principal component. The eigenvalue of the first principal component indicates a distribution width in which a set of pixels that forms the locus is distributed to the highest degree and can be regarded as the moving distance of the bright spot.

The counting device 103 calculates from the calculated moving distance of each bright spot, the moving speed of the bright spot (step S34). Subsequently, the counting device 103 selects one of the loci again (step S35). The counting device 103 determines for the selected locus whether the calculated moving distance is greater than a second threshold (step S36). This is a process for eliminating a locus of a bright spot that is not related to an external force but accidentally moves in a moving direction that is along the external-force direction, on the basis of whether the moving distance reaches a sufficient moving distance attained in a case of moving in response to exertion of the external force. If it is determined that the moving distance calculated for the selected locus is less than or equal to the second threshold (No in step S36), the locus is excluded from the counting target (step S37).

FIG. 5G illustrates that for each circled locus indicated by an arrow, the calculated moving distance is less than or equal to the second threshold. Therefore, the circled loci are excluded from loci used in counting, as illustrated in FIG. 5H.

Referring back to FIG. 4B, if it is determined that the moving distance calculated for the selected locus is greater than the second threshold (Yes in step S36), the flow proceeds to step S38. The counting device 103 determines whether the above-described processes are performed for all loci (step S38). If there is a locus that is not yet selected (No in step S38), the flow returns to step S33, and a locus is selected. On the other hand, if it is determined that all loci are selected (Yes in step S38), the flow proceeds to step S39.

The counting device 103 regards bright spots forming loci that are not excluded but are left in the image as bright spots resulting from bonded bodies and counts the bonded bodies (counting step S39).

Figure 5I:
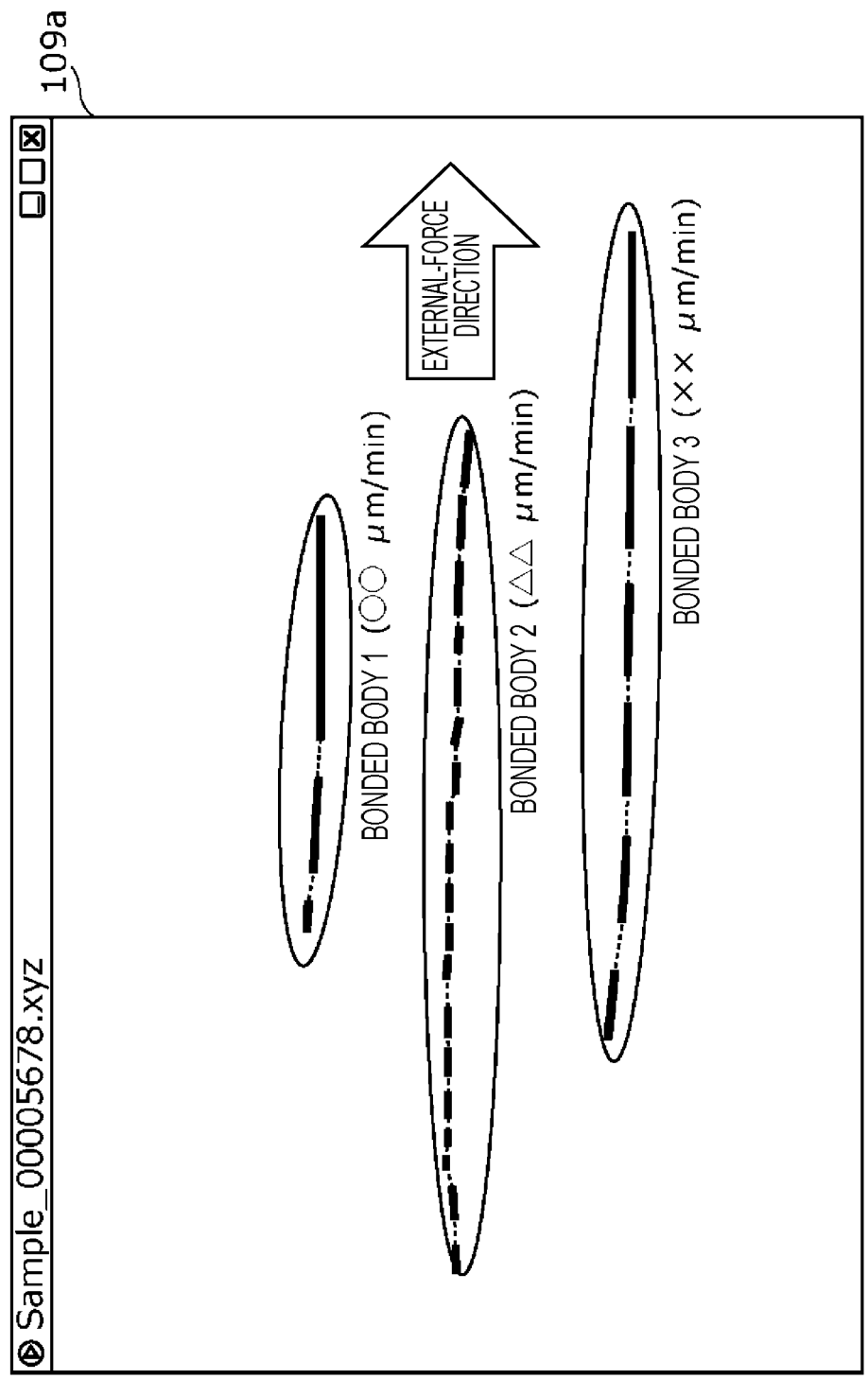
FIG. 5I is a ninth diagram illustrating the procedure for processing the image according to the embodiment.

As a result of counting, for example, an image as illustrated in FIG. 5I is output and displayed in the application window 109a. In FIG. 5I, three bonded bodies, namely, "bonded body 1", "bonded body 2", and "bonded body 3", that are not excluded but are left are displayed together with their moving speeds calculated from the respective loci.

Other Embodiments

Although an embodiment and so on have been described above, the present disclosure is not limited to the above-described embodiment and so on.

Although the constituent elements of the counting device have been illustrated in the above-described embodiment and so on, the functions of the constituent elements of the counting device may be distributed among parts of the counting device in any manner.

Further, a form obtained by making various modifications conceived by a person skilled in the art to the embodiment and so on or a form obtained by a combination of any of the constituent elements and functions in the embodiment and so on without departing from the spirit of the present disclosure is included in the present disclosure.

For example, although a configuration in which the calculated moving speeds are output together with the result of counting has been described in the above embodiment, a configuration may be employed in which the result of counting is output and the moving speeds are not calculated.

For example, although a configuration in which a locus formed by a bonded body is counted by using the moving distance calculated by using the eigenvalue and the degree of contribution of the first principal component in addition to the moving direction has been described in the above embodiment, a locus formed by a bonded body may be counted by using the moving direction.

For example, although various calculations are performed with the principal component analysis in the above embodiment, various calculations may be performed with any method, such as regression analysis or linear approximation.

The present disclosure is applicable to a device that is used to, for example, detect or observe a target substance simply, quickly, and accurately.

What is claimed is:

1. A counting method for counting a moving bonded body by exerting an external force in a predetermined direction, on a sample capable of containing the bonded body in which a target substance and a moving substance moving in response to exertion of the external force are bonded, the counting method comprising:
   obtaining a captured image of an object in the sample captured in a period from a first time point to a second time point later than the first time point during which the external force is exerted;
   binarizing the image to obtain a binarized image, performing filtering on the binarized image to identify boundaries between high-brightness pixels and low-brightness pixels in the binarized image, and extracting a string of the boundaries as a locus associated with movement of the object in the image;
   determining a moving direction of the object from the locus in the image; and
   counting the object as the bonded body in a case where a degree of coincidence between the predetermined direction and the moving direction is greater than a first threshold.

2. The counting method according to claim 1, wherein in the determining, the moving direction of the object is determined on the basis of an eigenvector of a first principal component based on a principal component analysis of pixels that correspond to the locus in the image.

3. The counting method according to claim 1, further comprising
   calculating a moving distance of the object during the period from the first time point to the second time point, wherein
   in the counting, a moving speed of the object counted as the bonded body is output by using the calculated moving distance and a length of the period from the first time point to the second time point.

4. The counting method according to claim 3, wherein in the calculating, the moving distance is calculated on the basis of an eigenvalue of a first principal component based on a principal component analysis of pixels that correspond to the locus in the image.

5. The counting method according to claim 3, wherein in the counting, the object is counted as the bonded body in a case where the degree of coincidence is greater than the first threshold and the calculated moving distance is greater than a second threshold.

6. The counting method according to claim 1, further comprising
   concatenating, among loci in the obtained image, two loci formed by the same object so as to form one locus.

7. The counting method according to claim 6, wherein in the concatenating, among the loci in the obtained image, for a combination of a one locus and another locus for which a degree of similarity between a moving direction corresponding to the one locus and a moving direction corresponding to the other locus is greater than a third threshold and for which a distance between a front end of the one locus in the moving direction corresponding to the one locus and a rear end of the other locus in the moving direction corresponding to the other locus is within a fourth threshold, the front end of the one locus and the rear end of the other locus are connected to each other to form one locus extending from a rear end of the one locus to a front end of the other locus.

8. The counting method according to claim 1, wherein the image is a composite image obtained by adding up brightness values of frame images successively captured in the period from the first time point to the second time point.

9. The counting method according to claim 1, wherein the moving substance is a dielectric and moves in response to a dielectrophoresis force when an external field is applied as the external force.

10. The counting method according to claim 1, wherein the moving substance is a magnetic substance and moves in response to a magnetic force when a magnetic field gradient is applied as the external force.

11. The counting method according to claim 1, wherein the target substance is a substance that forms a virus, and the moving substance is bonded to the substance with a bond therebetween, the bond being immobilized on a surface of the moving substance and specifically binding to the substance.

12. A recording medium storing a program for causing a computer to perform a counting method for counting a moving bonded body by exerting an external force in a predetermined direction, on a sample capable of containing the bonded body in which a target substance and a moving substance moving in response to exertion of the external force are bonded, the recording medium being a nonvolatile computer-readable recording medium, the counting method comprising:
   obtaining a captured image of an object in the sample captured in a period from a first time point to a second time point later than the first time point during which the external force is exerted;
   binarizing the image to obtain a binarized image, performing filtering on the binarized image to identify boundaries between high-brightness pixels and low-brightness pixels in the binarized image, and extracting a string of the boundaries as a locus associated with movement of the object in the image;
   determining a moving direction of the object from the locus in the image; and
   counting the object as the bonded body in a case where a degree of coincidence between the predetermined direction and the moving direction is greater than a first threshold.

13. A counting device comprising:
an obtainer that obtains an image including images of an object contained in a sample, the images being captured in a period from a first time point to a second time point later than the first time point during which an external force is applied to the sample in a predetermined direction;
a processor that binarizes the image to obtain a binarized image, performs filtering on the binarized image to identify boundaries between high-brightness pixels and low-brightness pixels in the binarized image, and extracts a string of the boundaries as a locus associated with movement of the object in the image;
a determiner that determines a moving direction of the object from the locus in the image; and
a counter that determines whether to count the object on the basis of the predetermined direction and the moving direction, wherein
the object includes a first substance and a target substance bonded to the first substance, and the first substance moves when the external force is applied to the first substance.

14. The counting device according to claim 13, wherein the image is a composite image, and a brightness value at a position i in the composite image is obtained on the basis of a value obtained by adding up brightness values at positions, corresponding to the position i, in frame images successively captured in the period from the first time point to the second time point.

* * * * *